(12) United States Patent
Oobayashi

(10) Patent No.: US 8,492,468 B2
(45) Date of Patent: Jul. 23, 2013

(54) POLYPROPYLENE RESIN COMPOSITION

(75) Inventor: Yoshiaki Oobayashi, Yokohama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/101,330

(22) Filed: May 5, 2011

(65) Prior Publication Data

US 2011/0301268 A1 Dec. 8, 2011

(30) Foreign Application Priority Data

Jun. 4, 2010 (JP) ................................. 2010-128729

(51) Int. Cl.
*C08L 23/16* (2006.01)
*C08K 5/20* (2006.01)

(52) U.S. Cl.
USPC ............................ 524/219; 524/218; 524/226

(58) Field of Classification Search
USPC ......................................... 524/219, 218, 226
See application file for complete search history.

(56) References Cited

U.S. PATENT DOCUMENTS

| | | | |
|---|---|---|---|
| 2004/0063830 A1 | 4/2004 | Schmidt et al. | |
| 2004/0152818 A1* | 8/2004 | Iwashita | 524/430 |
| 2010/0292371 A1* | 11/2010 | Maruyama et al. | 524/99 |

FOREIGN PATENT DOCUMENTS

| | | | |
|---|---|---|---|
| JP | 7-242610 A | | 9/1995 |
| JP | 7-278374 A | | 10/1995 |
| JP | 07-316357 | * | 12/1995 |
| JP | 8-100088 A | | 4/1996 |
| JP | 2007063484 A | | 3/2007 |
| JP | 2009120803 A | | 6/2009 |
| JP | 2009209348 A | | 9/2009 |
| WO | 0052089 A1 | | 9/2000 |

OTHER PUBLICATIONS

Machine translation of JP 07-316357. Dec. 1995.*
Blomenhofer et al: "Designer Nucleating Agents for Polypropylene", Macromolecules 2005, 38, 3688-3695.

* cited by examiner

*Primary Examiner* — John Uselding
(74) *Attorney, Agent, or Firm* — Panitch Schwarze Belisario & Nadel LLP

(57) ABSTRACT

A polypropylene resin composition, comprising (A) 51 to 99% by weight of a propylene polymer having a melt flow rate of 10 to 200 g/10 minutes, and containing 0.1 to 40% by weight of an ethylene unit and/or α-olefin unit having 4 to 10 carbon atoms and 60 to 99.9% by weight of a propylene unit, (B) 1 to 49% by weight of an ethylene polymer having density of 0.85 to 0.93 g/cm$^3$, and (C) 0.001 to 5 parts by weight of an amide compound as a nucleating agent.

4 Claims, No Drawings

POLYPROPYLENE RESIN COMPOSITION

FIELD OF THE INVENTION

The present invention relates to a polypropylene resin composition.

BACKGROUND OF THE INVENTION

An example of a nucleating agent-containing polypropylene resin composition is a polypropylene composition disclosed in JP 2004-515592A (corresponding to US 2004-63830A and WO 02/46300), which contains (a) a crystallizable polypropylene homopolymer, random copolymer, alternating or segmented copolymer, block copolymer or a blend of polypropylene with another synthetic polymer, and (b) 0.001 to 5% relative to the weight of component (a), of a specific trimesic acid derivative, and which gives a 1.1 to 1.2 mm-thick plate having a haze value of less than 62%.

One more example thereof is a propylene resin composition disclosed in JP 2009-209348A, which contains (a) a propylene-based polymer, and (b) a specific amount of a modifier containing an amide compound represented by a specific chemical structural formula, and which gives a polypropylene-based wrapping film.

SUMMARY OF THE INVENTION

However, the above polypropylene resin compositions are still not satisfactory in their moldability and balance between tensile strength and impact resistance at low temperature.

In view of the above circumstances, the present invention has an object to provide a polypropylene resin composition excellent in its moldability and balance between tensile strength and impact resistance at low temperature.

The present invention is a polypropylene resin composition, comprising following components (A), (B) and (C):

(A) 51 to 99% by weight of a propylene polymer having a melt flow rate of 10 to 200 g/10 minutes measured at 230° C. under a load of 2.16 kg, and containing 0.1 to 40% by weight of an ethylene unit and/or α-olefin unit having 4 to 10 carbon atoms and 60 to 99.9% by weight of a propylene unit;

(B) 1 to 49% by weight of an ethylene polymer having density of 0.85 to 0.93 g/cm$^3$; and (C) 0.001 to 5 parts by weight of an amide compound as a nucleating agent;

wherein the total of components (A) and (B) is 100% by weight, or is 100 parts by weight, and the total of the ethylene unit, α-olefin unit and propylene unit is 100% by weight,

DETAILED DESCRIPTION OF THE INVENTION

1. Component (A): Propylene Polymer

The propylene polymer of component (A) has a melt flow rate of 10 to 200 g/10 minutes, preferably 20 to 150 g/10 minutes, more preferably 30 to 100 g/10 minutes, and further preferably 30 to 80 g/10 minutes, measured at 230° C. under a load of 2.16 kg, from a viewpoint of excellence in its moldability and balance between tensile strength and impact resistance at low temperature.

The propylene polymer contains 0.1 to 40% by weight, preferably 0.1 to 30% by weight, more preferably 0.2 to 20% by weight, and further preferably 2 to 20% by weight of an ethylene unit and/or α-olefin unit having 4 to 10 carbon atoms, and contains 60 to 99.9% by weight, preferably 70 to 99.9% by weight, more preferably 80 to 99.8% by weight, and further preferably 80 to 98% by weight of a propylene unit, provided that the total of the ethylene unit, α-olefin unit and propylene unit is 100% by weight. The term "unit" contained in the above ethylene unit, α-olefin unit and propylene unit means a polymerization unit of a monomer. Therefore, the ethylene unit, for example, means a structural unit of —CH$_2$CH$_2$—.

Examples of the α-olefin having 4 to 10 carbon atoms are 1-butene, 1-pentene, 1-hexene, 4-methyl-1-pentene, 1-octene and 1-decene. Among them, preferred is 1-butene, 1-hexene or 1-octene.

Examples of the propylene polymer are a propylene-ethylene random copolymer; a random copolymer of propylene and an α-olefin having 4 to 10 carbon atoms such as a propylene-1-butene random copolymer, a propylene-1-hexene random copolymer, a propylene-1-octene random copolymer, and a propylene-1-decene random copolymer; a random copolymer of propylene, ethylene and an α-olefin having 4 to 10 carbon atoms such as a propylene-ethylene-1-butene random copolymer, a propylene-ethylene-1-hexene random copolymer, a propylene-ethylene-1-octene random copolymer, and a propylene-ethylene-1-decene random copolymer; a mixture containing a polymer component (I) and a polymer component (II) mentioned hereinafter; and a combination of two or more thereof. The propylene polymer may be combined with a propylene homopolymer.

From a viewpoint of high crystallinity and a balance between tensile strength and impact resistance of the polypropylene resin composition of the present invention, the propylene polymer has an isotactic pentad fraction (mmmm fraction) of preferably 0.97 or more, and more preferably 0.98 or more, measured by $^{13}$C-nuclear magnetic resonance ($^{13}$C-NMR analysis). The isotactic pentad fraction is a value with respect to a polymer component containing a major amount of an α-olefin unit such as a propylene unit, and is determined by a measurement method mentioned hereinafter. The larger and the closer to 1 (one) an isotactic pentad fraction is, the higher stereoregularity (therefore, the higher crystallinity) the propylene polymer has. When the propylene polymer is the above-mentioned propylene-ethylene random copolymer containing a major amount of a propylene unit, the above-mentioned propylene-α-olefin random copolymer containing a major amount of a propylene unit, or the above-mentioned propylene-ethylene-α-olefin random copolymer containing a major amount of a propylene unit, an isotactic pentad fraction of those random copolymers is measured with respect to a polymer chain consisting of propylene units. When the propylene polymer is the above-mentioned mixture containing polymer components (I) and (II), which is explained in detail hereinafter, its is tactic pentad fraction is measured with respect to polymer component (I) containing a major amount of a propylene unit.

The propylene polymer can be produced using a conventional polymerization catalyst and a conventional polymerization method. Examples of the polymerization catalyst are (1) a Ziegler catalyst system, (2) a Ziegler-Natta catalyst system, (3) a catalyst system comprising (3-1) a cyclopentadienyl ring-containing compound of a transition metal of group 4 of the Periodic Table and (3-2) an alkylaluminoxane, (4) a catalyst system comprising (4-1) a cyclopentadienyl ring-containing compound of a transition metal of group 4, (4-2) a compound which forms an ionic complex by reacting with the cyclopentadienyl ring-containing transition metal compound, and (4-3) an organoaluminum compound, and (5) a catalyst system obtained by supporting on inorganic particles such as silica and clay mineral, a catalyst component such as (5-1) a cyclopentadienyl ring-containing compound of a transition metal of group 4, (5-2) a compound which forms anionic complex by reacting with the cyclopentadienyl ring-containing transition metal compound, and (5-3) an organoaluminum compound. Those catalyst systems are disclosed in a patent literature such as JP 61-218606A (corresponding to U.S. Pat. No. 4,672,050), JP 5-194685A (corresponding to EP 534776A), JP 7-216017A (corresponding to U.S. Pat. No. 5,608,018), JP 9-316147A (corresponding to U.S. Pat. No. 5,990,242), JP 10-212319A (corresponding to US 6,187,883), and JP 2004-182981A. Also, the polymerization catalyst may be a pre-polymerization catalyst prepared by pre-polymerizing ethylene or an α-olefin in the presence of the above catalyst system.

Examples of the above polymerization method are a bulk polymerization method using an olefin, which is liquid at polymerization temperature, as a polymerization medium; a solution or slurry polymerization method carried out in an inert hydrocarbon solvent such as propane, butane, isobutane, pentane, hexane, heptane and octane; and a gas phase polymerization method, which polymerizes a gaseous monomer in a gaseous monomer-containing medium. Those polymerization methods are carried out in a batch-wise manner, a continuous manner, or a combination thereof. The continuous manner may be carried out by use of two or more polymerization reactors connected to one another, which is referred to as a multistage manner, a proportion and characteristic of a produced polymer being regulated in each of those polymerization reactors. Among them, preferred is a continuous gas phase polymerization method, or a bulk-gas phase polymerization method performing continuously a bulk polymerization method and a gas phase polymerization method, from an industrial and economical point of view. Polymerization conditions of those polymerization methods are determined or changed suitably depending on component (A), such as polymerization temperature, polymerization time, polymerization pressure, a monomer concentration, and a used amount of a catalyst.

The propylene polymer may be dried at temperature lower than its melting temperature, in order to remove a by-product contained therein such as a very low-molecular weight oligomer, and a remaining solvent contained therein.

The propylene polymer is preferably a mixture containing:

(I) 1 to 50%, preferably 1 to 40%, more preferably 10 to 40%, and further preferably 10 to 30% by weight of polymer component (I) produced in a former polymerization step, which is a propylene polymer component having intrinsic viscosity ($[\eta]_I$) of 0.1 to 5 dl/g, preferably 0.3 to 4 dl/g, more preferably 0.5 to 3 dl/g, and further preferably 0.5 to 1.3 dl/g, measured at 135° C. in tetralin; and (II) 50 to 99%, preferably 60 to 99%, more preferably 60 to 90%, and further preferably 70 to 90% by weight of polymer component (II) produced in a latter polymerization step, which contains 1 to 80%, preferably 5 to 60%, and more preferably 20 to 60% by weight of an ethylene unit and/or α-olefin unit having 4 to 10 carbon atoms, and 20 to 99%, preferably 40 to 95%, and more preferably 40 to 80% by weight of a propylene unit, provided that the total of the ethylene unit, α-olefin unit and propylene unit is 100% by weight, and which has intrinsic viscosity ($[\eta]_{II}$) of 1 to 20 dl/g, preferably 1 to 10 dl/g, more preferably 2 to 7 dl/g, and further preferably 2 to 6 dl/g, measured at 135° C. in tetralin, provided that the total of polymer components (I) and (II) is 100% by weight.

The above mixture containing polymer components (I) and (II) is preferably produced in the above-mentioned multistage manner with two or more polymerization reactors.

The above propylene polymer component in polymer component (I) is a propylene homopolymer component, or a copolymer component containing 70 to 99.99% by weight of a propylene unit and 0.01 to 30% by weight of an ethylene unit and/or α-olefin unit having 4 to 10 carbon atoms, provided that the total of polymer component (I) is 100% by weight. The α-olefin is preferably 1-butene, 1-hexene or 1-octene, and more preferably 1-butene.

Examples of the above copolymer component in polymer component (I) are a propylene-ethylene copolymer component, a propylene-1-butene copolymer component, a propylene-1-hexene copolymer component, a propylene-1-octene copolymer component, a propylene-ethylene-1-butene copolymer component, a propylene-ethylene-1-hexene copolymer component, and a propylene-ethylene-1-octene copolymer component.

Polymer component (I) is preferably a propylene homopolymer component, a propylene-ethylene copolymer component, a propylene-1-butene copolymer component, or a propylene-ethylene-1-butene copolymer component.

Examples of the above α-olefin having 4 to 10 carbon atoms in polymer component (II) are 1-butene, 1-pentene, 1-hexene, 4-methyl-1-pentene, 1-octene and 1-decene. Among them, preferred is 1-butene, 1-hexene or 1-octene.

Examples of above polymer component (II) are a propylene-ethylene copolymer component, a propylene-ethylene-1-butene copolymer component, a propylene-ethylene-1-hexene copolymer component, a propylene-ethylene-1-octene copolymer component, a propylene-ethylene-1-decene copolymer component, a propylene-1-butene copolymer component, a propylene-1-hexene copolymer component, a propylene-1-octene copolymer component, and a propylene-1-decene copolymer component. Among them, preferred is a propylene-ethylene copolymer component, a propylene-1-butene copolymer component, or a propylene-ethylene-1-butene copolymer component, and more preferred is a propylene-ethylene copolymer component.

When polymer component (I) is a propylene homopolymer component, an example of the propylene polymer (component (A)) is a mixture containing the propylene homopolymer component and a copolymer component as polymer component (II), such as a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, a propylene-1-octene copolymer component, and a propylene-1-decene copolymer component.

When polymer component (I) is a copolymer component containing a major amount of a propylene unit, examples of the propylene polymer (component (A)) are following mixtures (1) to (4):

(1) a mixture containing a propylene-ethylene copolymer component as polymer component (I) and a copolymer component as polymer component (II), such as a propylene-ethylene copolymer component, a propylene-ethylene-1-butene copolymer component, a propylene-ethylene-1-hexene copolymer component, a propylene-ethylene-1-octene copolymer component, a propylene-ethylene-1-decene copolymer component, a propylene-1-butene copolymer component, a propylene-1-hexene copolymer component, a propylene-1-octene copolymer component, and a propylene-1-decene copolymer component;

(2) a mixture containing a propylene-1-butene copolymer component as polymer component (I) and a copolymer component as polymer component (II), such as a propylene-ethylene copolymer component, a propylene-ethylene-1-butene copolymer component, a propylene-ethylene-1-hexene copolymer component, a propylene-ethylene-1-octene copolymer component, a propylene-ethylene-1-decene copolymer component, a propylene-1-butene copolymer component, a propylene-1-hexene copolymer component, a propylene-1-octene copolymer component, a propylene-1-decene copolymer component, a propylene-1-butene-1-hexene copolymer component, a propylene-1-butene-1-octene copolymer component, and a propylene-1-butene-1-decene copolymer component;

(3) a mixture containing a propylene-1-hexene copolymer component as polymer component (I) and a copolymer component as polymer component (II), such as a propylene-1-hexene copolymer component, a propylene-1-octene copolymer component, a propylene-1-decene copolymer component, and a propylene-ethylene-1-hexene copolymer component; and (4) a mixture containing a propylene-1-octene copolymer component as polymer component (I) and a copolymer component as polymer component (II), such as a propylene-1-octene copolymer component, a propylene-1-decene copolymer component, and a propylene-ethylene-1-octene copolymer component.

The propylene polymer (component (A)) is preferably a mixture containing a propylene homopolymer component as polymer component (I) and a propylene-ethylene copolymer component as polymer component (II); a mixture containing a propylene homopolymer component as polymer component (I) and a propylene-ethylene-1-butene copolymer component as polymer component (II); a mixture containing a propylene-ethylene copolymer component as polymer component (I) and a propylene-ethylene copolymer component as polymer component (II); a mixture containing a propylene-ethylene copolymer component as polymer component (I) and a propylene-ethylene-1-butene copolymer component as polymer component (II); a mixture containing a propylene-1-butene copolymer component as polymer component (I) and a propylene-1-butene copolymer component as polymer component (II); or a mixture containing a propylene-1-butene copolymer component as polymer component (I) and a propylene-ethylene-1-butene copolymer component as polymer component (II).

The propylene polymer (component (A)) is more preferably a mixture containing a propylene homopolymer component as polymer component (I) and a propylene-ethylene copolymer component as polymer component (II); or a mixture containing a propylene homopolymer component as polymer component (I) and a propylene-ethylene-1-butene copolymer component as polymer component (II).

A ratio of above $[\eta]_{II}$ to above $[\eta]_I$, $[\eta]_{II}/[\eta]_I$, is preferably 1 to 20, more preferably 2 to 10, and further preferably 2.5 to 8.

The $[\eta]_I$ is measured using a polymer taken out immediately after the former polymerization step from the former polymerization reactor. An intrinsic viscosity, $[\eta]_{Total}$, of the mixture containing polymer components (I) and (II) is measured using the mixture. The $[\eta]_{II}$ is calculated from the following formula:

$$[\eta]_{II}=([\eta]_{Total}-[\eta]_I \times X_I)/X_{II}$$

wherein $X_I$ is a proportion by weight of polymer component (I) in the mixture, and $X_{II}$ is a proportion by weight of polymer component (II) therein, and $X_I$ and $X_{II}$ are determined based on a material balance in a production of the mixture.

2. Component (B): Ethylene Polymer

The ethylene polymer of component (B) in the present invention means a polymer containing 50% by weight or more of an ethylene unit, provided that the total monomer unit in the ethylene polymer is 100% by weight. Examples of the ethylene polymer are an ethylene homopolymer, an ethylene-α-olefin copolymer, and a copolymer of ethylene with an α-olefin substituted with an alicyclic compound.

The above α-olefin has preferably 3 to 10 carbon atoms, and more preferably 4 to 10 carbon atoms. Examples of the α-olefin are propylene, 1-butene, 1-pentene, 1-hexene, 4-methyl-1-pentene, 1-octene, 1-decene, and 3-methyl-1-butene.

The above ethylene-α-olefin copolymer, and the above copolymer of ethylene with an α-olefin substituted with an alicyclic compound have an α-olefin unit in an amount of preferably 1 to 49% by weight, more preferably 5 to 49% by weight, and further preferably 10 to 49% by weight, provided that the total monomer unit contained in the respective copolymers is 100% by weight.

An example of the above ethylene homopolymer is a low-density polyethylene (LDPE), which is produced by a high-pressure radical polymerization process using a radical initiator, and which has a density of 0.91 to 0.93 g/cm$^3$, and has a branched structure containing a randomly-bonded ethylene unit.

Examples of the above ethylene-α-olefin copolymer are a linear low-density polyethylene (LLDPE) having a density of 0.90 to 0.93 g/cm$^3$ and crystallinity; and an ethylene-olefin copolymer elastomer having a density of 0.85 to 0.90 g/cm$^3$, a rubber-like elastic property, and low crystallinity.

An example of the above copolymer of ethylene with an α-olefin substituted with an alicyclic compound is an ethylene-vinylcyclohexane copolymer.

The ethylene polymer is preferably an ethylene-α-olefin copolymer such as an ethylene-1-butene copolymer, an ethylene-1-hexene copolymer, an ethylene-1-octene copolymer, an ethylene-1-decene copolymer, and an ethylene-(3-methyl-1-butene) copolymer.

The ethylene polymer has a melt flow rate of preferably 0.5 to 50 g/10 minutes, more preferably 1 to 30 g/10 minutes, and further preferably 1 to 20 g/10 minutes, measured at 190° C. under a load of 2.16 kg.

The ethylene polymer in the present invention is preferably an ethylene polymer containing 51 to 99% by weight of an ethylene unit and 1 to 49% by weight of an α-olefin unit having 4 to 10 carbon atoms, and having a melt flow rate of 0.5 to 50 g/10 minutes measured at 190° C. under a load of 2.16 kg, provided that the total of the ethylene unit and the α-olefin unit is 100% by weight.

The ethylene polymer can be produced using a conventional polymerization catalyst and a conventional polymerization method. Examples of the polymerization catalyst are a homogeneous catalyst system represented by a metallocene catalyst; a Ziegler catalyst system; and a Ziegler-Natta catalyst system. Examples of the homogeneous catalyst system are (1) a catalyst system comprising (1-1) a cyclopentadienyl ring-containing compound of a transition metal of group 4 of the Periodic Table and (1-2) an alkylaluminoxane; (2) a catalyst system comprising (2-1) a cyclopentadienyl ring-containing compound of a transition metal of group 4, (2-2) a compound which forms an ionic complex by reacting with the cyclopentadienyl ring-containing transition metal compound, and (2-3) an organoaluminum compound; and (3) a catalyst system obtained by supporting on inorganic particles such as silica and clay mineral, a catalyst component such as (3-1) a cyclopentadienyl ring-containing compound of a transition metal of group 4, (3-2) a compound which forms an ionic complex by reacting with the cyclopentadienyl ring-containing transition metal compound, and (3-3) an organoaluminum compound. Also, the polymerization catalyst may be a pre-polymerization catalyst prepared by pre-polymerizing ethylene or an α-olefin in the presence of the above catalyst system.

The ethylene polymer may be a commercially-available polymer, such as ENGAGE (trade name of Dow Chemical Japan Ltd.), TAFMER (trade name of Mitsui Chemicals, Inc.), NEO-ZEX and ULT-ZEX (trade name of Prime polymer Co., Ltd.), and EXCELLEN FX, SUMIKATHENE, SUMIKATHENE-L, and ESPRENE SPO (trade name of Sumitomo Chemical Co., Ltd.).

3. Component (C): Amide Compound

The amide compound of component (C) is used as a nucleating agent in the present invention, and has a nucleating function for the propylene polymer of component (A). Examples of the amide compound are those represented by following formulas (I) to (VI). Among them, preferred is an amide compound represented by formula (I) or (V):

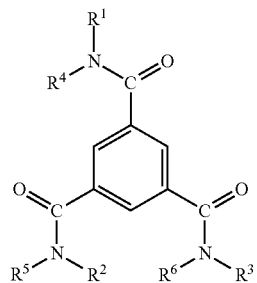

(I)

wherein $R^1$, $R^2$ and $R^3$ are the same as, or different from one another, and are a hydrogen atom or a hydrocarbyl group having 1 to 20 carbon atoms; and $R^4$, $R^5$ and $R^6$ are the same as, or different from one another, and are a hydrogen atom, a hydrocarbyl group having 1 to 20 carbon atoms, or a group represented by following formula (1),

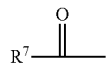

(1)

wherein $R^7$ is a hydrogen atom, a hydroxyl group, a hydrocarbyl group having 1 to 20 carbon atoms, a hydrocarbyloxy group having 1 to 20 carbon atoms, a mono(1 to 20 carbon atom-containing hydrocarby)amino group, a di(1 to 20 carbon atom-containing hydrocarby)amino group, or a hydrocarbylthio group having 1 to 20 carbon atoms;

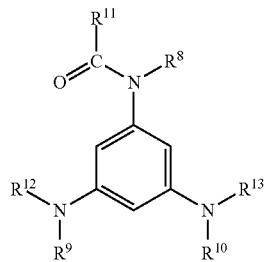

(II)

wherein $R^8$, $R^9$ and $R^{10}$ are the same as, or different from one another, and are a hydrogen atom or a hydrocarbyl group having 1 to 20 carbon atoms; $R^{11}$ is a hydrogen atom, a hydroxyl group, a hydrocarbyl group having 1 to 20 carbon atoms, a hydrocarbyloxy group having 1 to 20 carbon atoms, a mono(1 to 20 carbon atom-containing hydrocarby)amino group, a di(1 to carbon atom-containing hydrocarby)amino group, or a hydrocarbylthio group having 1 to 20 carbon atoms; and $R^{12}$ and $R^{13}$ are the same as, or different from each other, and are a hydrogen atom, a hydrocarbyl group having 1 to 20 carbon atoms, or a group represented by following formula (2),

(2)

wherein $R^{14}$ is a hydrogen atom, a hydroxyl group, a hydrocarbyl group having 1 to 20 carbon atoms, a hydrocarbyloxy group having 1 to 20 carbon atoms, a mono(1 to 20 carbon atom-containing hydrocarby)amino group, a di(1 to 20 carbon atom-containing hydrocarby)amino group, or a hydrocarbylthio group having 1 to 20 carbon atoms;

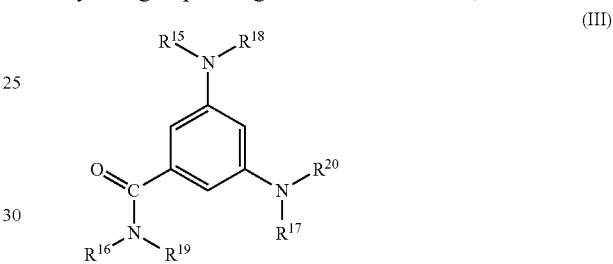

(III)

wherein $R^{15}$, $R^{16}$ and $R^{17}$ are the same as, or different from one another, and are a hydrogen atom or a hydrocarbyl group having 1 to 20 carbon atoms; and $R^{18}$, $R^{19}$ and $R^{20}$ are the same as, or different from one another, and are a hydrogen atom, a hydrocarbyl group having 1 to 20 carbon atoms, or a group represented by following formula (3),

(3)

wherein $R^{21}$ is a hydrogen atom, a hydroxyl group, a hydrocarbyl group having 1 to 20 carbon atoms, a hydrocarbyloxy group having 1 to 20 carbon atoms, a mono(1 to 20 carbon atom-containing hydrocarby)amino group, a di(1 to 20 carbon atom-containing hydrocarby)amino group, or a hydrocarbylthio group having 1 to 20 carbon atoms;

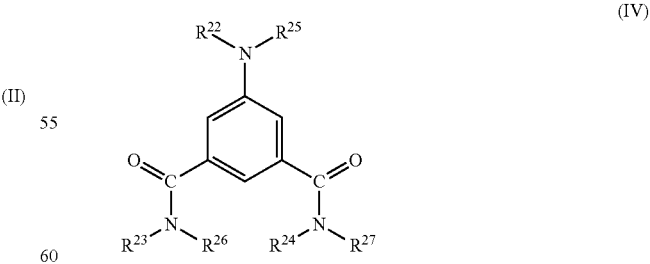

(IV)

wherein $R^{22}$, $R^{23}$ and $R^{24}$ are the same as, or different from one another, and are a hydrogen atom or a hydrocarbyl group having 1 to 20 carbon atoms; and $R^{25}$, $R^{26}$ and $R^{27}$ are the same as, or different from one another, and are a hydrogen atom, a hydrocarbyl group having 1 to 20 carbon atoms, or a group represented by following formula (4),

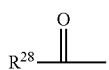
(4)

wherein $R^{28}$ is a hydrogen atom, a hydroxyl group, a hydrocarbyl group having 1 to 20 carbon atoms, a hydrocarbyloxy group having 1 to 20 carbon atoms, a mono(1 to 20 carbon atom-containing hydrocarby)amino group, a di(1 to 20 carbon atom-containing hydrocarby)amino group, or a hydrocarbylthio group having 1 to 20 carbon atoms;

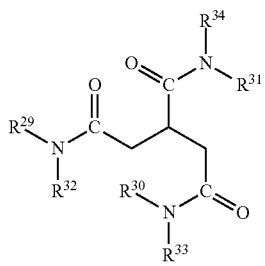
(V)

wherein $R^{29}$, $R^{30}$ and $R^{31}$ are the same as, or different from one another, and are a hydrogen atom or a hydrocarbyl group having 1 to 20 carbon atoms; and $R^{32}$, $R^{33}$ and $R^{34}$ are the same as, or different from one another, and are a hydrogen atom, a hydrocarbyl group having 1 to 20 carbon atoms, or a group represented by following formula (5),

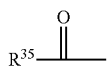
(5)

wherein $R^{35}$ is a hydrogen atom, a hydroxyl group, a hydrocarbyl group having 1 to 20 carbon atoms, a hydrocarbyloxy group having 1 to 20 carbon atoms, a mono(1 to 20 carbon atom-containing hydrocarby)amino group, a di(1 to 20 carbon atom-containing hydrocarby)amino group, or a hydrocarbylthio group having 1 to 20 carbon atoms; and

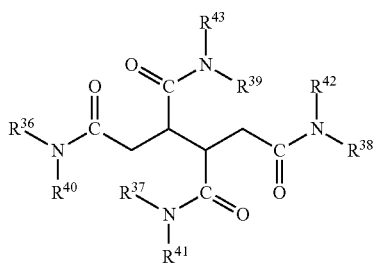
(VI)

wherein $R^{36}$, $R^{37}$, $R^{38}$ and $R^{39}$ are the same as, or different from one another, and are a hydrogen atom or a hydrocarbyl group having 1 to 20 carbon atoms; and $R^{40}$, $R^{41}$, $R^{42}$ and $R^{43}$ are the same as, or different from one another, and are a hydrogen atom, a hydrocarbyl group having 1 to 20 carbon atoms, or a group represented by following formula (6),

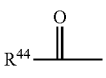
(6)

wherein $R^{44}$ is a hydrogen atom, a hydroxyl group, a hydrocarbyl group having 1 to 20 carbon atoms, a hydrocarbyloxy group having 1 to 20 carbon atoms, a mono(1 to 20 carbon atom-containing hydrocarby)amino group, a di(1 to 20 carbon atom-containing hydrocarby)amino group, or a hydrocarbylthio group having 1 to 20 carbon atoms.

Examples of the above hydrocarbyl group having 1 to 20 carbon atoms in formulas (I) to (VI) are an alkyl group having 1 to 20 carbon atoms, an alkenyl group having 2 to 20 carbon atoms, a cycloalkyl group having 3 to 20 carbon atoms, a cycloalkenyl group having 3 to 20 carbon atoms, an alkyl group having 4 to 20 carbon atoms substituted with cycloalkyl group, an aryl group having 6 to 20 carbon atoms, an aralkyl group having 7 to 20 carbon atoms, and adamantyl group.

Examples of the above alkyl group having 1 to 20 carbon atoms are a methyl group, an ethyl group, a n-propyl group, an isopropyl group, a n-butyl group, a sec-butyl group, an isobutyl group, a tert-butyl group, a 2-ethylbutyl group, a n-pentyl group, an isopentyl group, a 1,1-dimethylpropyl group, a 1,2-dimethylpropyl group, a 2,2-dimethylpropyl group, a 3-methylbutyl group, a 1-methylpentyl group, a 1,3-dimethylbutyl group, a n-hexyl group, a 1-methylhexyl group, a n-heptyl group, an isoheptyl group, a 1,1,3,3-tetramethylbutyl group, a 1-methylheptyl group, a 3-methylheptyl group, a n-octyl group, 1,1,3,3-tetramethylbutyl group, a 2-ethylhexyl group, a 1,1,3-trimethylhexyl group, a 1,1,3,3-tetramethylpentyl group, a n-nonyl group, an isononyl group, a n-decyl group, an undecyl group, a 1-methylundecyl group, a n-dodecyl group, a 1,1,3,3,5,5-hexamethylhexyl group, a n-tridecyl group, a n-tetradecyl group, a n-pentadecyl group, a n-hexadecyl group, a n-heptadecyl group, a n-octadecyl group, and a n-eicosyl group. Among them, preferred is a n-propyl group, an isopropyl group, a n-butyl group, a sec-butyl group, a tert-butyl group, a n-pentyl group, an isopentyl group, a 1,1-dimethylpropyl group, a 1,2-dimethylpropyl group, a 2,2-dimethylpropyl group, a 3-methylbutyl group, a n-hexyl group, a n-heptyl group, a n-octyl group, a 2-ethylhexyl group, 1,1,3,3-tetramethylbutyl group, an isononyl group, a n-dodecyl group, or a n-tridecyl group, and more preferred is an isopropyl group, a tert-butyl group, a 3-methylbutyl group, a 1,2-dimethylpropyl group, or a 1,1,3,3-tetramethylbutyl group.

Examples of the above alkenyl group having 2 to 20 carbon atoms are an allyl group, a 2-methally group, a butenyl group, a pentenyl group, a hexenyl group, and an oleyl group. Among them, preferred is a group having a saturated 1-positioned carbon atom, and more preferred is an allyl group or an oleyl group.

Examples of the above cycloalkyl group having 3 to 20 carbon atoms are a cyclopropyl group, a cyclobutyl group, a cyclopentyl group, a cyclohexyl group, a cycloheptyl group, a cyclooctyl group, a cyclododecyl group, and a cyclopropyl group. A further example thereof is a cycloalkyl group having 3 to 20 carbon atoms substituted with an alkyl group, such as a 2-methylcyclohexyl group, a 2-ethylcyclohexyl group, a 2-n-propylcyclohexyl group, a 2-isopropylcyclohexyl group, a 2-n-butylcyclohexyl group, a 2-isobutylcyclohexyl group, a 2-sec-butylcyclohexyl group, a 2-tert-butylcyclohexyl group, a 2-n-pentylcyclohexyl group, a 2-n-hexylcyclohexyl group, a 2-n-heptylcyclohexyl group, a 2-(2-ethylhexyl)cyclohexyl group, a 2-n-nonylcyclohexyl group, a 2-n-decylcyclohexyl group, a 3-methylcyclohexyl group, a 3-ethylcyclohexyl group, a 3-n-propylcyclohexyl group, a 3-isopropylcyclohexyl group, a 3-n-butylcyclohexyl group, a 3-isobutylcyclohexyl group, a 3-sec-butylcyclohexyl group, a 3-tert-butylcyclohexyl group, a 3-n-pentylcyclohexyl group, a 3-n-hexylcyclohexyl group, a 3-n-heptylcyclohexyl group, a 3-(2-ethylhexyl)cyclohexyl group, a 3-n-nonylcyclohexyl group, a 3-n-decylcyclohexyl group, a 4-methylcyclohexyl group, a 4-ethylcyclohexyl group, a 4-n-propylcyclohexyl group, a 4-isopropylcyclohexyl group, a 4-n-butylcyclohexyl group, a 4-isobutylcyclohexyl group, a 4-sec-butylcyclohexyl group, a 4-tert-butylcyclohexyl group, a 4-n-pentylcyclohexyl group, a 4-n-hexylcyclohexyl group, a 4-n-heptylcyclohexyl group, a 4-(2-ethylhexyl)cyclohexyl group, a 4-n-nonylcyclohexyl group, a 4-n-decylcyclohexyl group, a 2,3-dimethylcyclohexyl group, a 2,4-dimethylcyclohexyl group, a 2,3,5-trimethylcyclohexyl group, a 3,3,5-trimethylcyclohexyl group, a 2,4,6-trimethylcyclohexyl group, a 2,3-diethylcyclohexyl group, a 2,4-diethylcyclohexyl group, a 2,3,5-triethylcyclohexyl group, a 2,4,6-triethylcyclohexyl group, a 2,3-di-n-propylcyclohexyl group, a 2,4-di-n-propylcyclohexyl group, a 2,4,6-tri-n-propylcyclohexyl group, a 2,3-di-tert-butylcyclohexyl group, a 2,4-di-tert-butylcyclohexyl group, a 2,3,5-tri-tert-butylcyclohexyl group, and a 2,4,6-tri-tert-butylcyclohexyl group. Among them, preferred is a cyclopentyl group, a cyclohexyl group, or a cyclohexyl group substituted with an alkyl group.

An example of the above cycloalkenyl group having 3 to 20 carbon atoms is a cyclohexenyl group.

Examples of the above alkyl group substituted with a cycloalkyl group having 4 to 20 carbon atoms are a cyclobutylmethyl group, a cyclopentylmethyl group, a cyclohexylmethyl group, a cycloheptylmethyl group, a cyclooctylmethyl group, a cyclodecylmethyl group, a cyclobutylmethyl group, a cyclobutylmethyl group, a cyclobutylmethyl group, a cyclobutylethyl group, a cyclopentylethyl group, a cyclohexylethyl group, a cycloheptylethyl group, a cyclooctylethyl group, a cyclodecylethyl group, a cyclobutyl-n-propyl group, a cyclopentyl-n-propyl group, a cyclohexyl-n-propyl group, a cycloheptyl-n-propyl group, a cyclooctyl-n-propyl group, a cyclodecyl-n-propyl group, a cyclobutylisopropyl group, a cyclopentylisopropyl group, a cyclohexylisopropyl group, a ycloheptylisopropyl group, a cyclooctylisopropyl group, a cyclodecylisopropyl group, a cyclobutyl-n-butyl group, a cyclopentyl-n-butyl group, a cyclohexyl-n-butyl group, a cycloheptyl-n-butyl group, a cyclooctyl-n-butyl group, a cyclodecyl-n-butyl group, a cyclobutylisobutyl group, a cyclopentylisobutyl group, a cyclohexylisobutyl group, a cycloheptylisobutyl group, a cyclooctylisobutyl group, a cyclodecylisobutyl group, a cyclobutyl-sec-butyl group, a cyclopentyl-sec-butyl group, a cyclohexyl-sec-butyl group, a cycloheptyl-sec-butyl group, a cyclooctyl-sec-butyl group, a cyclodecyl-sec-butyl group, a cyclobutyl-tert-butyl group, a cyclopentyl-tert-butyl group, a cyclohexyl-tert-butyl group, a cycloheptyl-tert-butyl group, a cyclooctyl-tert-butyl group, and a cyclodecyl-tert-butyl group.

Examples of the above aryl group having 6 to 20 carbon atoms are a phenyl group, a naphthyl group, a 4-methylphenyl group, a 2-ethylphenyl group, a 4-ethylphenyl group, a 4-isopropylphenyl group, a 4-tert-butylphenyl group, a 4-sec-butylphenyl group, a 4-isobutylphenyl group, a dodecylphenyl group, a 3,5-dimethylphenyl group, a 2,3-dimethylphenyl group, a 2,4-dimethylphenyl group, a 2,6-dimethylphenyl group, a 2,4-di-tert-butylphenyl group, a 3,5-di-tert-butylphenyl group, a 2,6-diethylphenyl group, a 2-ethyl-6-methylphenyl group, a 2,6-diisopropylphenyl group, a 2,4,6-trimethylphenyl group, a 2,4,6-triethylphenyl group, and a methylnaphthyl group.

Examples of the above aralkyl group having 7 to 20 carbon atoms are a benzyl group, a phenethyl group, a 2-methylbenzyl group, a 4-methylbenzyl group, a 2,4-dimethylbenzyl group, a 2,6-dimethylbenzyl group, a 2,4,6-trimethylbenzyl group, a 2-tert-butylbenzyl group, and a 4-tert-butylbenzyl group.

The above hydrocarbyl group having 1 to 20 carbon atoms may contain a substituent such as a halogen atom, a hydroxyl group, a hydrocarbyloxy group having 1 to 20 carbon atoms, a mono(1 to 20 carbon atom-containing hydrocarby)amino group, and a di(1 to 20 carbon atom-containing hydrocarby) amino group. Examples of such a substituent-containing aryl group having 6 to 20 carbon atoms are a 4-methoxyphenyl group, a 4-ethoxyphenyl group, a 4-hydroxyphenyl group, a 4-fluorophenyl group, a 3,5-difluorophenyl group, a pentafluorophenyl group, a 2-chlorophenyl group, a 3-chlorophenyl group, a 3-chloro-6-methylphenyl group, a 3,5-di(trifluoromethyl)phenyl group, a 4-trifluoromethoxyphenyl group, and a 4-phenylaminophenyl group. Examples of such a substituent-containing aralkyl group having 7 to 20 carbon atoms are a 4-methoxybenzyl group and a 5-di-tert-butyl-4-hydroxybenzyl group.

Examples of the above hydrocarbyloxy group having 1 to 20 carbon atoms in formulas (I) to (VI) are an alkyloxy group having 1 to 20 carbon atoms, an aryloxy group having 6 to 20 carbon atoms, and an aralkyloxy group having 7 to 20 carbon atoms.

Examples of the above alkyloxy group having 1 to 20 carbon atoms are a methoxy group and an ethoxy group. Examples of the above aryloxy group having 6 to 20 carbon atoms are a phenyloxy group and a naphthyloxy group. Examples of the above aralkyloxy group having 7 to 20 carbon atoms are a benzyloxy group and a phenethyloxy group.

The above hydrocarbyloxy group having 1 to 20 carbon atoms may contain a substituent such as a halogen atom, a hydroxyl group, a hydrocarbyloxy group having 1 to 20 carbon atoms, a mono(1 to 20 carbon atom-containing hydrocarby)amino group, and a di(1 to 20 carbon atom-containing hydrocarby)amino group.

Examples of the above mono(1 to 20 carbon atom-containing hydrocarby)amino group in formulas (I) and (VI) are a mono(1 to 20 carbon atom-containing alkyl)amino group, a mono(6 to 20 carbon atom-containing aryl)amino group, and a mono(7 to 20 carbon atom-containing aralkyl)amino group. The "1 to 20 carbon atom-containing hydrocarby" group contained in the mono(1 to 20 carbon atom-containing hydrocarby)amino group may contain a substituent such as a halogen atom, a hydroxyl group, a hydrocarbyloxy group having 1 to 20 carbon atoms, a mono(1 to 20 carbon atom-containing hydrocarby)amino group, and a di(1 to 20 carbon atom-containing hydrocarby)amino group.

Examples of the above mono(1 to 20 carbon atom-containing alkyl)amino group are a methylamino group and an ethylamino group. An example of the above mono(6 to 20 carbon atom-containing aryl)amino group is a phenylamino group. An example of the above mono(7 to 20 carbon atom-containing aralkyl)amino group is a benzylamino group.

Examples of the above di(1 to 20 carbon atom-containing hydrocarby)amino group in formulas (I) and (VI) are a di(1 to 20 carbon atom-containing alkyl)amino group, a di(6 to 20 carbon atom-containing aryl)amino group, and a di(7 to 20 carbon atom-containing aralkyl)amino group, and a methylphenyl amino group. The "1 to 20 carbon atom-containing hydrocarby" group contained in the di(1 to 20 carbon atom-containing hydrocarby)amino group may contain a substituent such as a halogen atom, a hydroxyl group, a hydrocarbyloxy group having 1 to 20 carbon atoms, a mono(1 to 20 carbon atom-containing hydrocarby)amino group, and a di(1 to 20 carbon atom-containing hydrocarby)amino group.

Examples of the above di(1 to 20 carbon atom-containing alkyl)amino group are a dimethylamino group, a diethylamino group, and a methylethylamino group. An example of the above di(6 to 20 carbon atom-containing aryl)amino group is a diphenylamino group. An example of the above di(7 to 20 carbon atom-containing aralkyl)amino group is a dibenzylamino group.

Examples of the above hydrocarbylthio group having 1 to 20 carbon atoms in formulas (I) and (VI) are an alkylthio group having 1 to 20 carbon atoms, an arylthio group having 6 to 20 carbon atoms, and an aralkylthio group having 7 to 20 carbon atoms. The hydrocarbylthio group having 1 to 20 carbon atoms may contain a substituent such as a halogen atom, a hydroxyl group, a hydrocarbyloxy group having 1 to 20 carbon atoms, a mono(1 to 20 carbon atom-containing hydrocarby)amino group, and a di(1 to 20 carbon atom-containing hydrocarby)amino group.

Examples of the above alkylthio group having 1 to 20 carbon atoms are a methylthio group and an ethylthio group. Examples of the above arylthio group having 6 to 20 carbon atoms are a phenylthio group and a naphthylthio group. Examples of the above aralkylthio group having 7 to 20 carbon atoms are a benzylthio group and a phenethylthio group.

Examples of the amide compound represented by formula (I) are 1,3,5-benzenetricarboxylic acid tris(methylamide), 1,3,5-benzenetricarboxylic acid tris(ethylamide), 1,3,5-benzenetricarboxylic acid tris(n-propylamide), 1,3,5-benzenetricarboxylic acid tris(isopropylamide), 1,3,5-benzenetricarboxylic acid tris(n-butylamide), 1,3,5-benzenetricarboxylic acid tris(isobutylamide), 1,3,5-benzenetricarboxylic acid tris(tert-butylamide), 1,3,5-benzenetricarboxylic acid tris(n-pentylamide), 1,3,5-benzenetricarboxylic acid tris(n-hexylamide), 1,3,5-benzenetricarboxylic acid tris(n-heptylamide), 1,3,5-benzenetricarboxylic acid tris(n-octylamide), 1,3,5-benzenetricarboxylic acid tris(tert-octylamide), 1,3,5-benzenetricarboxylic acid tris(n-decylamide), 1,3,5-benzenetricarboxylic acid tris(n-dodecylamide), 1,3,5-benzenetricarboxylic acid tris(1-ethylpropylamide), 1,3,5-benzenetricarboxylic acid tris(1,1-dimethylpropylamide), 1,3,5-benzenetricarboxylic acid tris(1,2-dimethylpropylamide), 1,3,5-benzenetricarboxylic acid tris(3-methylbutylamide), 1,3,5-benzenetricarboxylic acid tris(cyclopropylamide), 1,3,5-benzenetricarboxylic acid tris(cyclobutylamide), 1,3,5-benzenetricarboxylic acid tris(cyclopentylamide), 1,3,5-benzenetricarboxylic acid tris(cycloheptylamide), 1,3,5-benzenetricarboxylic acid tris(cyclohexylamide), 1,3,5-benzenetricarboxylic acid tris(cyclooctylamide), 1,3,5-benzenetricarboxylic acid tris(cyclononylamide), 1,3,5-benzenetricarboxylic acid tris(cyclodecylamide), 1,3,5-benzenetricarboxylic acid tris(cyclododecylamide), 1,3,5-benzenetricarboxylic acid tris(2-methylcyclohexylamide), 1,3,5-benzenetricarboxylic acid tris(3-methylcyclohexylamide), 1,3,5-benzenetricarboxylic acid tris(4-methylcyclohexylamide), 1,3,5-benzenetricarboxylic acid tris(2-ethylcyclohexylamide), 1,3,5-benzenetricarboxylic acid tris(3-ethylcyclohexylamide), 1,3,5-benzenetricarboxylic acid tris(4-ethylcyclohexylamide), 1,3,5-benzenetricarboxylic acid tris(2-tert-butylcyclohexylamide), 1,3,5-benzenetricarboxylic acid tris(3-tert-butylcyclohexylamide), 1,3,5-benzenetricarboxylic acid tris(4-tert-butylcyclohexylamide), 1,3,5-benzenetricarboxylic acid tris(2,3-dimethylcyclohexylamide), 1,3,5-benzenetricarboxylic acid tris(2,4-dimethylcyclohexylamide), 1,3,5-benzenetricarboxylic acid tris(2,3,5-trimethylcyclohexylamide), 1,3,5-benzenetricarboxylic acid tris(3,3,5-trimethylcyclohexylamide), 1,3,5-benzenetricarboxylic acid tris(2,4,6-trimethylcyclohexylamide), 1,3,5-benzenetricarboxylic acid tris(2,3-diethylcyclohexylamide), 1,3,5-benzenetricarboxylic acid tris(2,4-diethylcyclohexylamide), 1,3,5-benzenetricarboxylic acid tris(2,3,5-triethylcyclohexylamide), 1,3,5-benzenetricarboxylic acid tris(2,4-di-n-butylcyclohexylamide), 1,3,5-benzenetricarboxylic acid tris (2,4,6-tri-n-butylcyclohexylamide), 1,3,5-benzenetricarboxylic acid tris(2,4-diisobutylcyclohexylamide), tris(2,4,6-triisobutylcyclohexylamide), 1,3,5-benzenetricarboxylic acid tris(2,4-di-tert-butylcyclohexylamide), 1,3,5-benzenetricarboxylic acid tris(2,4,6-tri-tert-butylcyclohexylamide), 1,3,5-benzenetricarboxylic acid tris(2-methyl-4-ethylcyclohexylamide), 1,3,5-benzenetricarboxylic acid tris(2-methyl-4-n-propylcyclohexylamide), 1,3,5-benzenetricarboxylic acid tris(2-methyl-4-isopropylcyclohexylamide), 1,3,5-benzenetricarboxylic acid tris(2-methyl-4-isobutylcyclohexylamide), 1,3,5-benzenetricarboxylic acid tris(2-methyl-4-tert-butylcyclohexylamide), 1,3,5-benzenetricarboxylic acid tris (phenylamide), 1,3,5-benzenetricarboxylic acid tris(2-methylphenylamide), 1,3,5-benzenetricarboxylic acid tris(3-methylphenylamide), 1,3,5-benzenetricarboxylic acid tris(4-methylphenylamide), 1,3,5-benzenetricarboxylic acid tris(2-ethylphenylamide), 1,3,5-benzenetricarboxylic acid tris(3-ethylphenylamide), 1,3,5-benzenetricarboxylic acid tris(4-ethylphenylamide), 1,3,5-benzenetricarboxylic acid tris(2-n-propylphenylamide), 1,3,5-benzenetricarboxylic acid tris(3-n-propylphenylamide), 1,3,5-benzenetricarboxylic acid tris (4-n-propylphenylamide), 1,3,5-benzenetricarboxylic acid tris(2-isopropylphenylamide), 1,3,5-benzenetricarboxylic acid tris(3-isopropylphenylamide), 1,3,5-benzenetricarboxylic acid tris(4-isopropylphenylamide), 1,3,5-benzenetricarboxylic acid tris(2-n-butylphenylamide), 1,3,5-benzenetricarboxylic acid tris(3-n-butylphenylamide), 1,3,5-benzenetricarboxylic acid tris(4-n-butylphenylamide), 1,3,5-benzenetricarboxylic acid tris(2-tert-butylphenylamide), 1,3,5-benzenetricarboxylic acid tris(3-tert-butylphenylamide), 1,3,5-benzenetricarboxylic acid tris(4-tert-butylphenylamide), 1,3,5-benzenetricarboxylic acid tris(2,3-dimethylphenylamide), 1,3,5-benzenetricarboxylic acid tris(2,4-dimethylphenylamide), 1,3,5-benzenetricarboxylic acid tris(3,4-dimethylphenylamide), 1,3,5-benzenetricarboxylic acid tris (3,5-dimethylphenylamide), 1,3,5-benzenetricarboxylic acid tris(2,4,6-trimethylphenylamide), 1,3,5-benzenetricarboxylic acid tris(2-methyl-3-ethylphenylamide), 1,3,5-benzenetricarboxylic acid tris(2-methyl-4-ethylphenylamide), 1,3,5-benzenetricarboxylic acid tris(2-methyl-4-n-propylphenylamide), 1,3,5-benzenetricarboxylic acid tris(2-methyl-4-isopropylphenylamide), 1,3,5-benzenetricarboxylic acid tris(2-methyl-4-n-butylphenylamide), 1,3,5-benzenetricarboxylic acid tris(2-methyl-4-isobutylphenylamide), 1,3,5-benzenetricarboxylic acid tris(2-methyl-4-tert-butylphenylamide), 1,3,5-benzenetricarboxylic acid tris(2-methyl-4,6-di-tert-butylphenylamide), 1,3,5-benzenetricarboxylic acid tris(4-fluorophenylamide), 1,3,5-benzenetricarboxylic acid tris(2-methyl-4-fluorophenylamide), 1,3,5-benzenetricarboxylic acid tris(3,5-difluorophenylamide), 1,3,5-benzenetricarboxylic acid tris (pentafluorophenylamide), 1,3,5-benzenetricarboxylic acid tris(3,5-bis(trifluoromethyl)phenylamide), 1,3,5-benzenetricarboxylic acid tris(4-methoxyphenylamide), 1,3,5-benzenetricarboxylic acid tris(4-ethoxyphenylamide), 1,3,5-benzenetricarboxylic acid tris(4-(trifluoromethoxy)phenylamide), 1,3,5-benzenetricarboxylic acid tris(cyclohexylmethylamide), 1,3,5-benzenetricarboxylic acid tris(R(-)-1-cyclohexylethylamide), 1,3,5-benzenetricarboxylic acid tris(S(+)-1-cyclohexylethylamide), 1,3,5-benzenetricarboxylic acid tris(benzylamide), and 1,3,5-benzenetricarboxylic acid tris(1-adamantylamide); and a combination of two or more thereof.

Examples of the amide compound represented by formula (V) are 1,2,3-propanetricarboxylic acid trihexylamide, 1,2,3-propanetricarboxylic acid tridodecyamide, 1,2,3-propanetricarboxylic acid trioctadecylamide, 1,2,3-propanetricarboxylic acid trianilide, 1,2,3-propanetricarboxylic acid tricyclohexylamide, 1,2,3-propanetricarboxylic acid tri(2-methylcyclohexylamide), 1,2,3-propanetricarboxylic acid tri(3-methylcyclohexylamide), 1,2,3-propanetricarboxylic acid tri(4-methylcyclohexylamide), 1,2,3-propanetricarboxylic acid tri(2-ethylcyclohexylamide), 1,2,3-propanetricarboxylic acid tri(3-ethylcyclohexylamide), 1,2,3-propanetricarboxylic acid tri(4-ethylcyclohexylamide), 1,2,3-propanetricarboxylic acid tri(2-n-propylcyclohexylamide), 1,2,3-propanetricarboxylic acid tri(3-n-propylcyclohexylamide), 1,2,3-propanetricarboxylic acid tri(4-n-propylcyclohexylamide), 1,2,3-propanetricarboxylic acid tri(2-isopropylcyclohexylamide), 1,2,3-propanetricarboxylic acid tri(3-isopropylcyclohexylamide), 1,2,3-propanetricarboxylic acid tri(4-isopropylcyclohexylamide), 1,2,3-propanetricarboxylic acid tri(2-n-butylcyclohexylamide), 1,2,3-propanetricarboxylic acid tri(3-n-butylcyclohexylamide), 1,2,3-propanetricarboxylic acid tri(4-n-butylcyclohexylamide), 1,2,3-propanetricarboxylic acid tri(2-isobutylcyclohexylamide), 1,2,3-propanetricarboxylic acid tri(3-isobutylcyclohexylamide), 1,2,3-propanetricarboxylic acid tri(4-isobutylcyclohexylamide), 1,2,3-propanetricarboxylic acid tri(2-sec-butylcyclohexylamide), 1,2,3-propanetricarboxylic acid tri(3-sec-butylcyclohexylamide), 1,2,3-propanetricarboxylic acid tri(4-sec-butylcyclohexylamide), 1,2,3-propanetricarboxylic acid tri(2-tert-butylcyclohexylamide), 1,2,3-propanetricarboxylic acid tri(3-tert-butylcyclohexylamide), 1,2,3-propanetricarboxylic acid tri(4-tert-butylcyclohexylamide), 1,2,3-propanetricarboxylic acid tri(4-n-pentylcyclohexylamide), 1,2,3-propanetricarboxylic acid tri(4-n-hexylcyclohexylamide), 1,2,3-propanetricarboxylic acid tri(4-n-octylcyclohexylamide), 1,2,3-propanetricarboxylic acid tri[4-(2-ethylhexyl)cyclohexylamide], 1,2,3-propanetricarboxylic acid tri(4-n-nonylcyclohexylamide), 1,2,3-propanetricarboxylic acid tri(4-n-decylcyclohexylamide), 1,2,3-propanetricarboxylic acid [cyclohexyldi(2-methylcyclohexyl)triamide], 1,2,3-propanetricarboxylic acid [dicyclohexyl(2-methylcyclohexyl)triamide], 1,2,3-propanetricarboxylic acid tri(2,3-dimethylhexylamide), 1,2,3-propanetricarboxylic acid tri(2,4-dimethylhexylamide), 1,2,3-propanetricarboxylic acid tri(3,4-dimethylhexylamide), 1,2,3-propanetricarboxylic acid tri(3,5-dimethylhexylamide), 1,2,3-propanetricarboxylic acid tri(2,4,6-trimethylhexylamide), 1,2,3-propanetricarboxylic acid tri(2-methyl-3-ethylhexylamide), 1,2,3-propanetricarboxylic acid tri(2-methyl-4-ethylhexylamide), 1,2,3-propanetricarboxylic acid tri(2-methyl-4-n-propylhexylamide), 1,2,3-propanetricarboxylic acid tri(2-methyl-4-isopropylhexylamide), 1,2,3-propanetricarboxylic acid tri(2-methyl-4-n-butylhexylamide), 1,2,3-propanetricarboxylic acid tri(2-methyl-4-isobutylhexylamide), 1,2,3-propanetricarboxylic acid tri(2-methyl-4-tert-butylhexylamide), 1,2,3-propanetricarboxylic acid tri(2-methyl-4,6-di-tert-butylhexylamide), 1,2,3-propanetricarboxylic acid triphenylamide, 1,2,3-propanetricarboxylic acid tri(2-methylphenylamide), 1,2,3-propanetricarboxylic acid tri(3-methylphenylamide), 1,2,3-propanetricarboxylic acid tri(4-methylphenylamide), 1,2,3-propanetricarboxylic acid tri(2-ethylphenylamide), 1,2,3-propanetricarboxylic acid tri(3-ethylphenylamide), 1,2,3-propanetricarboxylic acid tri(4-ethylphenylamide), 1,2,3-propanetricarboxylic acid tri(2-n-propylphenylamide), 1,2,3-propanetricarboxylic acid tri(3-n-propylphenylamide), 1,2,3-propanetricarboxylic acid tri(4-n-propylphenylamide), 1,2,3-propanetricarboxylic acid tri(2-isopropylphenylamide), 1,2,3-propanetricarboxylic acid tri(3-isopropylphenylamide), 1,2,3-propanetricarboxylic acid tri(4-isopropylphenylamide), 1,2,3-propanetricarboxylic acid tri(2-n-butylphenylamide), 1,2,3-propanetricarboxylic acid tri(3-n-butylphenylamide), 1,2,3-propanetricarboxylic acid tri(4-n-butylphenylamide), 1,2,3-propanetricarboxylic acid tri(2-tert-butylphenylamide), 1,2,3-propanetricarboxylic acid tri(3-tert-butylphenylamide), 1,2,3-propanetricarboxylic acid tri(4-tert-butylphenylamide), 1,2,3-propanetricarboxylic acid tri(2,3-dimethylphenylamide), 1,2,3-propanetricarboxylic acid tri(2,4-dimethylphenylamide), 1,2,3-propanetricarboxylic acid tri(3,4-dimethylphenylamide), 1,2,3-propanetricarboxylic acid tri(3,5-dimethylphenylamide), 1,2,3-propanetricarboxylic acid tri(2,4,6-trimethylphenylamide), 1,2,3-propanetricarboxylic acid tri(2-methyl-3-ethylphenylamide), 1,2,3-propanetricarboxylic acid tri(2-methyl-4-ethylphenylamide), 1,2,3-propanetricarboxylic acid tri(2-methyl-4-n-propylphenylamide), 1,2,3-propanetricarboxylic acid tri(2-methyl-4-isopropylphenylamide), 1,2,3-propanetricarboxylic acid tri(2-methyl-4-n-butylphenylamide), 1,2,3-propanetricarboxylic acid tri(2-methyl-4-isobutylphenylamide), 1,2,3-propanetricarboxylic acid tri(2-methyl-4-tert-butylphenylamide), 1,2,3-propanetricarboxylic acid tri(2-methyl-4,6-di-tert-butylphenylamide), 1,2,3-propanetricarboxylic acid tri(4-fluorophenylamide), 1,2,3-propanetricarboxylic acid tri(2-methyl-4-fluorophenylamide), 1,2,3-propanetricarboxylic acid tri(3,5-difluorophenylamide), 1,2,3-propanetricarboxylic acid tri(pentafluorophenylamide), 1,2,3-propanetricarboxylic acid tri(3,5-bis(trifluoromethyl)phenylamide), 1,2,3-propanetricarboxylic acid tri(4-methoxyphenylamide), 1,2,3-propanetricarboxylic acid tri(4-ethoxyphenylamide), 1,2,3-propanetricarboxylic acid tri(4-(trifluoromethoxy)phenylamide), 1,2,3-propanetricarboxylic acid tri(cyclohexylmethylamide), 1,2,3-propanetricarboxylic acid tri(R(-)-1-cyclohexylethylamide), 1,2,3-propanetricarboxylic acid tri(S(+)-1-cyclohexylethylamide), and 1,2,3-propanetricarboxylic acid tri(benzylamide); and a combination of two or more thereof.

Among those amide compounds represented by formula (V), preferred is an amide compound having a hydrogen atom as $R^{29}$, $R^{30}$ and $R^{31}$, and a cycloalkyl group having 3 to 20 carbon atoms, which may contain a substituent, an aryl group having 6 to 20 carbon atoms, or an aralkyl group having 7 to 20 carbon atoms as $R^{32}$, $R^{33}$ and $R^{34}$; more preferred is an amide compound having a hydrogen atom as $R^{29}$, $R^{30}$ and $R^{31}$, and a cyclohexyl group, which may contain a substituent, a phenyl group, or a substituted phenyl group as $R^{32}$, $R^{33}$ and $R^{34}$; and further preferred is 1,2,3-propanetricarboxylic acid tricyclohexylamide, 1,2,3-propanetricarboxylic acid tri(2-methylcyclohexylamide), 1,2,3-propanetricarboxylic acid tri(3-methylcyclohexylamide), 1,2,3-propanetricarboxylic acid tri(4-methylcyclohexylamide), 1,2,3-propanetricarboxylic acid tri(2,3-dimethylhexylamide), 1,2,3-propanetricarboxylic acid tri(2,4-dimethylhexylamide), 1,2,3-propanetricarboxylic acid tri(3,4-dimethylhexylamide), 1,2,3-propanetricarboxylic acid tri(3,5-dimethylhexylamide), 1,2,3-propanetricarboxylic acid tri(2,4,6-trimethylhexylamide), 1,2,3-propanetricarboxylic acid triphenylamide, 1,2,3-propanetricarboxylic acid tri(2-methylphenylamide), 1,2,3-propanetricarboxylic acid tri(3-methylphenylamide), 1,2,3-propanetricarboxylic acid tri(4-methylphenylamide), 1,2,3-propanetricarboxylic acid tri(2,3-dimethylphenylamide), 1,2,3-propanetricarboxylic acid tri(2,4-dimethylphenylamide), 1,2,3-propanetricarboxylic acid tri(3,4-dimethylphenylamide), 1,2,3-propanetricarboxylic acid tri(3,5-dimethylphenylamide), or 1,2,3-propanetricarboxylic acid tri(2,4,6-trimethylphenylamide).

Examples of the amide compound represented by formula (VI) are 1,2,3,4-butanetetracarboxylic acid tetrahexylamide, 1,2,3,4-butanetetracarboxylic acid tetradodecyamide, 1,2,3,4-butanetetracarboxylic acid tetraoctadecylamide, 1,2,3,4-butanetetracarboxylic acid tetraanilide, 1,2,3,4-butanetetracarboxylic acid tetracyclohexylamide, 1,2,3,4-butanetetracarboxylic acid tetra(2-methylcyclohexylamide), 1,2,3,4-butanetetracarboxylic acid tetra(3-methylcyclohexylamide), 1,2,3,4-butanetetracarboxylic acid tetra(4-methylcyclohexylamide), 1,2,3,4-butanetetracarboxylic acid tetra(2-ethylcyclohexylamide), 1,2,3,4-butanetetracarboxylic acid tetra(3-ethylcyclohexylamide), 1,2,3,4-butanetetracarboxylic acid tetra(4-ethylcyclohexylamide), 1,2,3,4-butanetetracarboxylic acid tetra(2-n-propylcyclohexylamide), 1,2,3,4-butanetetracarboxylic acid tetra(3-n-propylcyclohexylamide), 1,2,3,4-butanetetracarboxylic acid tetra(4-n-propylcyclohexylamide), 1,2,3,4-butanetetracarboxylic acid tetra(2-isopropylcyclohexylamide), 1,2,3,4-butanetetracarboxylic acid tetra(3-isopropylcyclohexylamide), 1,2,3,4-butanetetracarboxylic acid tetra(4-isopropylcyclohexylamide), 1,2,3,4-butanetetracarboxylic acid tetra(2-n-butylcyclohexylamide), 1,2,3,4-butanetetracarboxylic acid tetra(3-n-butylcyclohexylamide), 1,2,3,4-butanetetracarboxylic acid tetra(4-n-butylcyclohexylamide), 1,2,3,4-butanetetracarboxylic acid tetra(2-isobutylcyclohexylamide), 1,2,3,4-butanetetracarboxylic acid tetra(3-isobutylcyclohexylamide), 1,2,3,4-butanetetracarboxylic acid tetra(4-isobutylcyclohexylamide), tetra(2-sec-butylcyclohexylamide), 1,2,3,4-butanetetracarboxylic acid tetra(3-sec-butylcyclohexylamide), 1,2,3,4-butanetetracarboxylic acid tetra(4-sec-butylcyclohexylamide), 1,2,3,4-butanetetracarboxylic acid tetra(2-tert-butylcyclohexylamide), 1,2,3,4-butanetetracarboxylic acid tetra(3-tert-butylcyclohexylamide), 1,2,3,4-butanetetracarboxylic acid tetra(4-tert-butylcyclohexylamide), 1,2,3,4-butanetetracarboxylic acid tetra(4-n-pentylcyclohexylamide), 1,2,3,4-butanetetracarboxylic acid tetra(4-n-hexylcyclohexylamide), 1,2,3,4-butanetetracarboxylic acid tetra(4-n-heptylcyclohexylamide), 1,2,3,4-butanetetracarboxylic acid tetra(4-n-octylcyclohexylamide), 1,2,3,4-butanetetracarboxylic acid tetra[4-(2-ethylhexyl)cyclohexylamide], 1,2,3,4-butanetetracarboxylic acid tetra(4-n-nonylcyclohexylamide), 1,2,3,4-butanetetracarboxylic acid tetra(4-n-decylcyclohexylamide), [dicyclohexyldi(2-methylcyclohexyl)tetraamide], 1,2,3,4-butanetetracarboxylic acid tetra(2,3-dimethylhexylamide), 1,2,3,4-butanetetracarboxylic acid tetra(2,4-dimethylhexylamide), 1,2,3,4-butanetetracarboxylic acid tetra(3,4-dimethylhexylamide), 1,2,3,4-butanetetracarboxylic acid tetra(3,5-dimethylhexylamide), 1,2,3,4-butanetetracarboxylic acid tetra(2,4,6-trimethylhexylamide), 1,2,3,4-butanetetracarboxylic acid tetra(2-methyl-3-ethylhexylamide), 1,2,3,4-butanetetracarboxylic acid tetra(2-methyl-4-ethylhexylamide), 1,2,3,4-butanetetracarboxylic acid tetra(2-methyl-4-n-propylhexylamide), 1,2,3,4-butanetetracarboxylic acid tetra(2-methyl-4-isopropylhexylamide), 1,2,3,4-butanetetracarboxylic acid tetra(2-methyl-4-n-butylhexylamide), 1,2,3,4-butanetetracarboxylic acid tetra(2-methyl-4-isobutylhexylamide), 1,2,3,4-butanetetracarboxylic acid tetra(2-methyl-4-tert-butylhexylamide), tetra(2-methyl-4,6-di-tert-butylhexylamide), 1,2,3,4-butanetetracarboxylic acid tetraphenylamide, 1,2,3,4-butanetetracarboxylic acid tetra(2-methylphenylamide), 1,2,3,4-butanetetracarboxylic acid tetra(3-methylphenylamide), 1,2,3,4-butanetetracarboxylic acid tetra(4-methylphenylamide), 1,2,3,4-butanetetracarboxylic acid tetra(2-ethylphenylamide), 1,2,3,4-butanetetracarboxylic acid tetra(3-ethylphenylamide), 1,2,3,4-butanetetracarboxylic acid tetra(4-ethylphenylamide), 1,2,3,4-butanetetracarboxylic acid tetra(2-n-propylphenylamide), 1,2,3,4-butanetetracarboxylic acid tetra(3-n-propylphenylamide), 1,2,3,4-butanetetracarboxylic acid tetra(4-n-propylphenylamide), 1,2,3,4-butanetetracarboxylic acid tetra(2-isopropylphenylamide), 1,2,3,4-butanetetracarboxylic acid tetra(3-isopropylphenylamide), 1,2,3,4-butanetetracarboxylic acid tetra(4-isopropylphenylamide), 1,2,3,4-butanetetracarboxylic acid tetra(2-n-butylphenylamide), 1,2,3,4-butanetetracarboxylic acid tetra(3-n-butylphenylamide), 1,2,3,4-butanetetracarboxylic acid tetra(4-n-butylphenylamide), 1,2,3,4-butanetetracarboxylic acid tetra(2-tert-butylphenylamide), 1,2,3,4-butanetetracarboxylic acid tetra(3-tert-butylphenylamide), 1,2,3,4-butanetetracarboxylic acid tetra(4-tert-butylphenylamide), 1,2,3,4-butanetetracarboxylic acid tetra(2,3-dimethylphenylamide), 1,2,3,4-butanetetracarboxylic acid tetra(2,4-dimethylphenylamide), 1,2,3,4-butanetetracarboxylic acid tetra(3,4-dimethylphenylamide), 1,2,3,4-butanetetracarboxylic acid tetra(3,5-dimethylphenylamide), 1,2,3,4-butanetetracarboxylic acid tetra(2,4,6-trimethylphenylamide), 1,2,3,4-butanetetracarboxylic acid tetra(2-methyl-3-ethylphenylamide), 1,2,3,4-butanetetracarboxylic acid tetra(2-methyl-4-ethylphenylamide), 1,2,3,4-butanetetracarboxylic acid tetra(2-methyl-4-n-propylphenylamide), tetra(2-methyl-4-isopropylphenylamide), 1,2,3,4-butanetetracarboxylic acid tetra(2-methyl-4-n-butylpropylamide), 1,2,3,4-butanetetracarboxylic acid tetra(2-methyl-4-isobutylphenylamide), 1,2,3,4-butanetetracarboxylic acid tetra(2-methyl-4-tert-butylphenylamide), 1,2,3,4-butanetetracarboxylic acid tetra(2-methyl-4,6-di-tert-butylphenylamide), 1,2,3,4-butanetetracarboxylic acid tetra(4-fluorophenylamide), 1,2,3,4-butanetetracarboxylic acid tetra(2-methyl-4-fluorophenylamide), 1,2,3,4-butanetetracarboxylic acid tetra(3,5-difluorolphenylamide), 1,2,3,4-butanetetracarboxylic acid tetra(pentafluorophenylamide), 1,2,3,4-butanetetracarboxylic acid tetra(3,5-bis(trifluoromethyl)phenylamide), 1,2,3,4-butanetetracarboxylic acid tetra(4-methoxyphenylamide), 1,2,3,4-butanetetracarboxylic acid tetra(4-ethoxyphenylamide), 1,2,3,4-butanetetracarboxylic acid tetra(4-(trifluoromethoxy)phenylamide), 1,2,3,4-butanetetracarboxylic acid tetra(cyclohexylmethylamide), 1,2,3,4-butanetetracarboxylic acid tetra(R(−)-1-cyclohexylethylamide), 1,2,3,4-butanetetracarboxylic acid tetra(S(+)-1-cyclohexylethylamide), and 1,2,3,4-butanetetracarboxylic acid tetra(benzylamide); and a combination of two or more thereof.

Among those amide compounds represented by formula (VI), preferred is an amide compound having a hydrogen atom as $R^{36}$, $R^{37}$, $R^{38}$ and $R^{39}$, and a cycloalkyl group having 3 to 20 carbon atoms which may contain a substituent, an aryl group having 6 to 20 carbon atoms, or an aralkyl group having 7 to 20 carbon atoms as $R^{40}$, $R^{41}$, $R^{42}$ and $R^{43}$; more preferred is an amide compound having a hydrogen atom as $R^{36}$, $R^{37}$, $R^{38}$ and $R^{39}$, and a cyclohexyl group which may contain a substituent, a phenyl group, or a substituted phenyl group as $R^{40}$, $R^{41}$, $R^{42}$ and $R^{43}$; and further preferred is 1,2,3,4-butanetetracarboxylic acid tetracyclohexylamide, 1,2,3,4-butanetetracarboxylic acid tetra(2-methylcyclohexylamide), 1,2,3,4-butanetetracarboxylic acid tetra(3-methylcyclohexylamide), 1,2,3,4-butanetetracarboxylic acid tetra(4-methylcyclohexylamide), 1,2,3,4-butanetetracarboxylic acid tetra(2,3-dimethylhexylamide), 1,2,3,4-butanetetracarboxylic acid tetra(2,4-dimethylhexylamide), 1,2,3,4-butanetetracarboxylic acid tetra(3,4-dimethylhexylamide), 1,2,3,4-butanetetracarboxylic acid tetra(3,5-dimethylhexylamide), 1,2,3,4-butanetetracarboxylic acid tetra(2,4,6-trimethylhexylamide), 1,2,3,4-butanetetracarboxylic acid tetraphenylamide, 1,2,3,4-butanetetracarboxylic acid tetra(2-methylphenylamide), 1,2,3,4-butanetetracarboxylic acid tetra(3-methylphenylamide), 1,2,3,4-butanetetracarboxylic acid tetra(4-methylphenylamide), 1,2,3,4-butanetetracarboxylic acid tetra(2,3-dimethylphenylamide), 1,2,3,4-butanetetracarboxylic acid tetra(2,4-dimethylphenylamide), 1,2,3,4-butanetetracarboxylic acid tetra(3,4-dimethylphenylamide), 1,2,3,4-butanetetracarboxylic acid tetra(3,5-dimethylphenylamide), or 1,2,3,4-butanetetracarboxylic acid tetra(2,4,6-trimethylphenylamide).

The above amide compounds can be produced by a method disclosed in a literature such as WO 2004-515592, JP 2009-209348A, JP 2007-231134A, JP 2007-063484A, and JP 07-278374A.

The amide compounds represented by formulas (V) and (VI) can be easily produced by reacting a corresponding polycarboxylic acid or its acid anhydride with one or more monoamines, according to a method disclosed in a literature such as JP 07-242610A.

The amide compounds represented by formulas (I) to (VI) are not limited in their crystal system. Examples thereof are a hexagonal crystal system, a monoclinic crystal system, and a cubical crystal system. Amide compounds having those crystal systems can be produced by a method known in the art.

The above amide compound can be combined with a dispersing agent, in order to improve its dispersibility in the polypropylene resin composition of the present invention. Examples of the dispersing agent are an aliphatic acid having 10 to 24 carbon atoms; a hydroxylated aliphatic acid having 10 to 24 carbon atoms; an alkyl ester of an aliphatic acid; an alkali metal salt of an aliphatic acid, such as a sodium salt, a potassium salt and a lithium salt; an alkaline-earth metal salt of an aliphatic acid, such as a calcium salt, a magnesium salt and a zinc salt; an alcohol substituted with a hydrocarbyl group having 10 to 30 carbon atoms; a polyalcohol such as glycerin, ethylene glycol, propylene glycol, pentaerythritol, dipentaerythritol, tripentaerythritol, and sorbitol: an ester of those polyalcohols; a monoamide of an aliphatic acid such as a lauric acid, myristic acid, palmitic acid, oleic acid, stearic acid, behenic acid, erucic acid, hydroxypalmitic acid, and hydroxystearic acid; and a bisamide of an aliphatic acid such as ethylenebislauric acid amide, ethylenebismyristic acid amide, ethylenebispalmitic acid amide, ethylenebisoleic acid amide, ethylenebisstearic acid amide, ethylenebisbehenic acid amide, and ethylenebiserucic acid amide.

The above amide compound has preferably a particulate shape, which has a volume average particle diameter of preferably 0.01 to 10 μm, more preferably 0.01 to 5 μm, and further preferably 0.01 to 3 μm, measured with a laser diffraction type-particle size distribution measurement apparatus such as HELOS (trade name of Sympatec GmbH), and has a largest particle diameter of preferably 50 μm or smaller, and more preferably 10 μm or smaller.

An amide compound having the above volume average particle diameter can be produced, for example, by a method comprising pulverizing and classifying an amide compound with a pulverizing apparatus such as a fluidized bed-type COUNTER-JET MILL 100AFG (trade name of Hosokawa Micron Corporation) and SUPERSONIC JET MILL PJM-200 (trade name of Nippon Pneumatic Mfg. Co., Ltd.).

Examples of the amide compound, which is commercially available, or is included in FDA Standard in USA (Code of Federal Regulations), are N JESTER TF-1 (trade name of New Japan Chemical co., ltd.), whose chemical name is N,N', N''-tricyclohexyl-1,3,5-benzenetricarboxamide, or 1,3,5-benzenetricarboxylic acid tris(cyclohexylamide), and has CAS Reg. No. of 160535-58-0, and N,N',N''-tris(2-methylcyclohexyl)-1,2,3-propanetricarboxamide, which has CAS Reg. No. of 160535-46-6; and IRGACLEAR XT386 (trade name of BASF Japan Ltd.) and N-[3,5-bis-(2,2-dimethylproionylamino)-phenyl]-2,2-dimethyl-propionamide, which has CAS Reg. No. of 745070-61-5.

4. Component (D): Additive

The polypropylene resin composition of the present invention may contain additives known in the art, such as neutralizing agents, antioxidants, UV absorbers, light stabilizers, antistatic agents, lubricants, antiblocking agents, processing aids, organic peroxides, colorants, foaming agents, nucleating agents for cell forming, nucleating agents (excluding component (C) in the present invention), plasticizers, flame retardants, crosslinking agents, crosslinking aids, glittering materials, antibacterial agents, light-diffusing agents, inorganic fillers, anti-scratch agents, and a combination of two or more thereof. Among them, preferred are neutralizing agents, antioxidants, UV absorbers, light stabilizers, or colorants.

Examples of the above neutralizing agents are metal salts of higher fatty acids (metal soap), hydrotalcite, oxides or hydroxides of alkaline earth metals, and a combination of two or more thereof.

The above higher fatty acids of the metal soap are preferably fatty acids having from 10 to 30 carbon atoms, and further preferably fatty acids having from 12 to 18. The metal of the metal soap is preferably calcium, sodium, magnesium, lithium, aluminum, or zinc, and more preferably calcium. Among them, preferred is calcium stearate as metal salts of higher fatty acids. The metal soap can also be used in order to improve dispersibility of component (C) in the polypropylene resin composition of the present invention, or in order to disperse a pigment in the polypropylene resin composition thereof, wherein the metal soap is used in an amount of preferably 0.05 to 5 parts by weight, more preferably 0.05 to 2 parts by weight, and further preferably 0.1 to 1 part by weight, per 100 parts by weight of the polypropylene resin composition of the present invention.

The above hydrotalcite is a natural or synthetic product, and its property such as a crystal structure, a crystal particle diameter, and a moisture content is suitably determined. It is permitted, if necessary, to use a surface-treated hydrotalcite.

Above hydrotalcite is preferably a compound represented by the following formula:

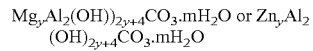

$Mg_y Al_2(OH)_{2y+4} CO_3 \cdot mH_2O$ or $Zn_y Al_2(OH)_{2y+4} CO_3 \cdot mH_2O$ wherein Y is a number of 4 or more, and m is a positive number; and more preferably compounds represented by the following formulas:

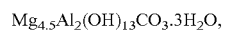

$Mg_{4.5} Al_2(OH)_{13} CO_3 \cdot 3H_2O$,

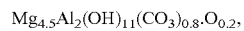

$Mg_{4.5} Al_2(OH)_{11}(CO_3)_{0.8} \cdot O_{0.2}$, $Mg_4 Al_2(OH)_{12} CO_3 \cdot 3H_2O$,

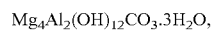

$Mg_5 Al_2(OH)_{14} CO_3 \cdot 4H_2O$,

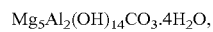

$Mg_6 Al_2(OH)_{16} CO_3 \cdot 4H_2O$

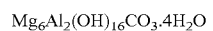

$Zn_4 Al_2(OH)_{12} CO_3 \cdot mH_2O$ (m is a number between 0 and 4), or

Mg$_3$ZnAl$_2$(OH)$_{12}$CO$_3$.mH$_2$O (m is a number between 0 and 4).

Examples of the above oxides or hydroxides of alkaline earth metals as the neutralizing agents are calcium oxide, magnesium oxide, calcium hydroxide, and magnesium hydroxide. Among them, preferred is calcium hydroxide.

The above neutralizing agent is used in amount of usually 0.001 to 0.5 part by weight, preferably 0.005 to 0.2 part by weight, and more preferably 0.01 to 0.2 part by weight, provided that the total of the propylene polymer and the ethylene polymer contained in the resin composition is 100 parts by weight.

Examples of the above antioxidants are phenolic antioxidants, phosphorus atom-containing antioxidants, sulfur atom-containing antioxidants, hydroxylamine, and metal deactivators. Among them, preferred are phenolic antioxidants, phosphorus atom-containing antioxidants, or sulfur atom-containing antioxidants.

Examples of the above phenolic antioxidants are tetrakis[methylene-3(3',5'-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxyl-1,1-dimethylethyl]-2,4,8,10-tetraoxaspiro[5•5]undecane, triethylene glycol-N-bis-3-(3-tert-butyl-5-methyl-4-hydroxyphenyl) propionate, 1,6-hexanediolbis[3-(3,5-di-tert-butyl-4-hydroxyphenyl) propionate], 2,2-thiobis-diethylenebis[3-(3,5-di-tert-butyl-4-hydroxyphenyl)propionate], and tocopherols. Among them, preferred is tetrakis[methylene-3(3',5'-di-tert-butyl-4-hydroxyphenyl)propionate]methane, or 3,9-bis[2-{3-(3-tert-butyl-4-hydroxy-5-methylphenyl)propionyloxy}-1,1-dimethylethyl]-2,4,8,10-tetraoxaspiro[5•5]undecane, from a viewpoint of processing stability and thermal stability of the polypropylene resin composition of the present invention.

The above phenolic antioxidant is used in amount of preferably 0.01 to 2 parts by weight, more preferably 0.01 to 1 part by weight, and further preferably 0.01 to 0.5 part by weight, provided that the total of the propylene polymer and the ethylene polymer contained in the resin composition is 100 parts by weight.

Examples of the above phosphorus atom-containing antioxidants are tris(2,4-di-tert-butylphenyl)phosphite, bis(2,4-di-tert-butylphenyl)pentaerythritol diphosphite, and 2,4,8,10-tetra-tert-butyl-6-[3-(3-methyl-4-hydroxy-5-tert-butylphenyl)propoxy]dibenzo[d,f][1,3,2]dioxaphosphepine, from a viewpoint of processing stability of the polypropylene resin composition of the present invention.

The above phosphorus atom-containing antioxidant is used in amount of preferably 0.01 to 2 parts by weight, more preferably 0.01 to 1 part by weight, and further preferably 0.01 to 0.5 part by weight, provided that the total of the propylene polymer and the ethylene polymer contained in the resin composition is 100 parts by weight.

Examples of the above sulfur atom-containing antioxidants are dimyristyl-3,3'-thiodipropionate, neopentan-tetrayltetrakis(3-laurylthiopropionate), and bis[2-methyl-4-(3-n-alkyl(C$_{12}$-C$_{14}$)thiopropionyloxy)-5-tert-butylphenyl]sulfide, wherein "alkyl(C$_{12}$-C$_{14}$)" means an alkyl group having 12 to 14 carbon atoms, from a viewpoint of a heat aging resistance of the polypropylene resin composition of the present invention.

The above sulfur atom-containing antioxidant is used in an amount of preferably 0.01 to 2 parts by weight, more preferably 0.01 to 1 part by weight, and further preferably 0.01 to 0.5 part by weight, provided that the total of the propylene polymer and the ethylene polymer contained in the resin composition is 100 parts by weight.

Examples of the above UV absorbers are phenyl salicylate, 4-tert-butylphenyl salicylate, 2,4-di-tert-butylphenyl 3',5'-di-tert-butyl-4'-hydroxybenzoate, myristyl 3,5-di-tert-butyl-4-hydroxybenzoate, lauryl 3,5-di-tert-butyl-4-hydroxybenzoate, palmityl 3,5-di-tert-butyl-4-hydroxybenzoate, stearyl 3,5-di-tert-butyl-4-hydroxybenzoate, behenyl 3,5-di-tert-butyl-4-hydroxybenzoate, montanyl 3,5-di-tert-butyl-4-hydroxybenzoate, 4-tert-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-tert-octylphenyl)benzotriazole, 2-(2'-hydroxy-3'-tert-butyl-5'-methylphenyl)-5-chlorobenzotriazole, 2-(3'-sec-butyl-2'-hydroxy-5'-tert-butylphenyl)benzotriazole, 2-(2'-hydroxy-4'-octyloxyphenyl)benzotriazole, 2-(3',5'-di-tert-amyl-2'-hydroxyphenyl)benzotriazole and 2-[2'-hydroxy-3',5'-bis(α,α-dimethylbenzyl)phenyl]-2H-benzotriazole. Among them, preferred is 2,4-di-tert-butylphenyl 3',5'-di-tert-butyl-4'-hydroxybenzoate, lauryl 3,5-di-tert-butyl-4-hydroxybenzoate, palmityl 3,5-di-tert-butyl-4-hydroxybenzoate, stearyl 3,5-di-tert-butyl-4-hydroxybenzoate, or behenyl 3,5-di-tert-butyl-4-hydroxybenzoate, in order to obtain the polypropylene resin composition of the present invention excellent in its hue.

Examples of the above light stabilizers are low molecular weight-light stabilizers and oligomer type-high molecular weight-light stabilizers. Specific examples thereof are bis(2,2,6,6-tetramethyl-4-piperidyl)sebacate; a mixture containing bis(1,2,2,6,6-pentamethyl-4-piperidyl)sebacate and methyl 1,2,2,6,6-pentamethyl-4-piperidyl sebacate; bis(1,2,2,6,6-pentamethyl-4-piperidyl) [[3,5-bis(1,1-dimethylethyl)-4-hydroxyphenyl]methyl]butyl malonate; a reaction product of bis(2,2,6,6-tetramethyl-1(octyloxy)-4-piperidyl) decanedioate, 1,1-dimethylethyl hydroperoxide, and octane; 4-benzoyloxy-2,2,6-6-tetramethylpiperidine; a mixed ester prepared from 2,2,6,6-tetramethyl-4-piperidinol and a higher fatty acid; tetrakis(2,2,6,6-tetramethyl-4-piperidyl) 1,2,3,4-butanetetracarboxylate; tetrakis(1,2,2,6,6-pentamethyl-4-piperidyl) 1,2,3,4-butanetetracarboxylate; a polycondensate of dimethyl succinate with 4-hydroxy-2,2,6,6-tetramethyl-1-piperidine ethanol; poly[{6-(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}]; a polycondensate of dibutylamine•1,3,5-triazine•N,N'-bis(2,2,6,6-tetramethyl-4-piperidyl-1,6-hexamethylenediamine with N-(2,2,6,6-tetramethyl-4-piperidyl)butylamine; N,N',N",N'''-tetrakis(4,6-bis(butyl-(N-methyl-2,2,6,6-tetramethylpiperidin-4-yl)amino)triazin-2-yl)-4,7-diazadecane-1,10-diamine; and mixed {1,2,2,6,6-pentamethyl-4-piperidyl/β,β,β',β'-tetramethyl-3,9-[2,4,8,10-tetraoxaspiro(5,5)undecane]diethyl}-1,2,3,4-butanetetracarboxylate. Among them, in order to obtain the polypropylene resin composition of the present invention excellent in its light stability, preferred is bis(2,2,6,6-tetramethyl-4-piperidyl)sebacate; a reaction product of bis(2,2,6,6-tetramethyl-1(octyloxy)-4-piperidyl)decanedioate, 1,1-dimethylethyl hydroperoxide, and octane; tetrakis(2,2,6,6-tetramethyl-4-piperidyl) 1,2,3,4-butanetetracarboxylate; tetrakis(1,2,2,6,6-pentamethyl-4-piperidyl) 1,2,3,4-butanetetracarboxylate; polycondensates of dimethyl succinate with 4-hydroxy-2,2,6,6-tetramethyl-1-piperidine ethanol; or poly[{6-(1,1,3,3-tetramethylbutyl)amino-1,3,5-triazin-2,4-diyl}{(2,2,6,6-tetramethyl-4-piperidyl)imino}hexamethylene {(2,2,6,6-tetramethyl-4-piperidyl)imino}].

The above light stabilizers is used in an amount of preferably 0.01 to 2 parts by weight, more preferably 0.01 to 1 part by weight, and further preferably 0.01 to 0.5 part by weight, provided that the total of the propylene polymer and the ethylene polymer contained in the polypropylene resin composition is 100 parts by weight.

Examples of the above colorants are inorganic pigments such as iron oxide, titanium oxide, zinc oxide, burnt ocher, cadmium red, cadmium yellow, permanent blue, cobalt blue, titanium yellow, white lead, red lead, lead yellow, Berlin blue, and a combination of two or more thereof; organic pigments such as quinacridon, polyazo yellow, anthraquinon yellow, polyazo red, azo lake yellow, perylene, phthalocyanine green, phthalocyanine blue, isoindolinone yellow, and a combination of two or more thereof; and a combination of one or more of those inorganic pigments with one or more of those organic pigments. Those pigments may be combined with a pigment dispersing agent such as the above metal salts of higher fatty acids (metal soap), in order to disperse the pigments sufficiently in the polypropylene resin composition of the present invention.

5. Polypropylene Resin Composition

The polypropylene resin composition of the present invention contains component (C) in an amount of 0.001 to 5 parts by weight, preferably 0.01 to 5 parts by weight, more preferably 0.01 to 1 part by weight, further preferably 0.03 to 0.5 part by weight, and particularly preferably 0.1 to 0.3 part by weight, provided that the total of components (A) and (B) is 100 parts by weight.

The polypropylene resin composition of the present invention contains component (A) in an amount of 51 to 99% by weight, preferably 60 to 99% by weight, and more preferably 70 to 95% by weight, and contains component (B) in an amount of 1 to 49% by weight, preferably 1 to 40% by weight, and more preferably 5 to 30% by weight, provided that the total of components (A) and (B) is 100% by weight.

The polypropylene resin composition of the present invention has a melt flow rate of preferably 10 to 400 g/10 minutes, more preferably 15 to 300 g/10 minutes, and further preferably 15 to 150 g/10 minutes, measured at 230° C. under a load of 2.16 kg, from a viewpoint of moldability.

From a viewpoint of impact resistance at low temperature and appearance of a molded article comprising the polypropylene resin composition of the present invention, such as a film, sheet and injection-molded article, it is preferable that the molded article contains few fish eyes, which are a point-like projection or hollow, and which result from insufficient dispersion of components (A), (B) and (C) in the polypropylene resin composition. In order to obtain a molded article containing few fish eyes, the polypropylene resin composition of the present invention, for example, is melt-mixed at 180° C. or higher, and then the resultant molten mixture is filtered. The filtration rate of the molten mixture, per unit time or per unit area of a filter, can be determined arbitrarily, as long as its filtration efficiency does not become less efficient. The filtration is carried out in a single-stage or multistage manner. Plural filters in the latter manner are arranged in series, parallel or in combination thereof to a flow of the molten mixture.

The polypropylene resin composition of the present invention may contain other resin and/or rubber than components (A) and (B). Examples thereof are a polymer containing a polymerization unit of styrene and/or its derivative such as polystyrene, poly(p-methylstyrene), and poly(α-methylstyrene); acrylonitrile/styrene copolymer (AS resin); acrylonitrile/butadiene/styrene copolymer (ABS resin); special acrylic rubber/acrylonitrile/styrene copolymer (AAS resin); acrylonitrile/chlorinated polyethylene/styrene copolymer (ACS resin); polychloroprene; chlorinated rubber; polyvinyl chloride; polyvinylidene chloride; acrylic resin; ethylene/vinyl alcohol copolymer resin; fluororesin; polyacetal; grafted polyphenylene ether resin; grafted polyphenylene sulfide resin; polyurethane; polyamide; polyester resin such as polyethylene terephthalate and polybutylene terephthalate; polycarbonate; polysulfone; polyether ether ketone; polyether sulfone; aromatic polyester resins; epoxy resin; dially phthalate prepolymer; silicone resin; silicone rubber; polybutadiene; 1,2-polybutadiene; polyisoprene; styrene/butadiene copolymer; butadiene/acrylonitrile copolymer; epichlorohydrin rubber; acrylic rubber; natural rubber.

Also, the polypropylene resin composition of the present invention may contain a polymer such as polylactic acid (PLA resin) and polybutylene terephthalate (PBT resin), produced by polymerizing a plant-derived monomer extracted from a biomaterial.

Further, the polypropylene resin composition of the present invention may contain an organic or inorganic filler. Examples of the inorganic filler are glass fiber, calcium carbonate, talc, silica, mica, clay, whisker, and basic magnesium sulfate.

The polypropylene resin composition of the present invention can be produced by melt-kneading components (A), (B) and (C) and the above optional components with one another, at 180° C. or higher, preferably 180 to 300° C., and more preferably 180 to 250° C., using a melt-kneading apparatus known in the art such as a melt extruder and a Banbury mixer.

Examples of a method for mixing component (C) with components (A) and (B) and optional components are following methods (1) to (3):

(1) a method comprising mixing a necessary amount of component (C) with a mixture containing a necessary amount of components (A) and (B);

(2) a method comprising mixing (2.1) a given amount of a mixture (master batch) containing (2.1.1) 100 parts by weight of component (A) or (B), or 100 parts by weight of a mixture of components (A) and (B) and (2.1.2) 1 to 100 parts by weight, preferably 1 to 50 parts by weight, and more preferably 5 to 30 parts by weight of component (C) with (2.2) a mixture containing a given amount of components (A) and (B); and (3) a method comprising steps of (i) mixing 10 to 900 parts by weight, preferably 10 to 500 parts by weight, and more preferably 20 to 200 parts by weight of component (C) with 100 parts by weight of optional components, thereby making a mixture, (ii) solidifying the mixture in a granular state, thereby making granular particles, and (iii) mixing a given amount of the granular particles with a mixture of a necessary amount of components (A) and (B);

wherein the term "necessary amount" means an amount corresponding to the amount prescribed in the present invention, and the term "given amount" means an amount such that an amount of components (A), (B) and (C) contained in a finally-obtained mixture (polypropylene resin composition) satisfies the amount prescribed in the present invention.

Examples of the above melt kneading apparatus known in the art are a single screw extruder; a co-rotating twin screw extruder such as ZSK (trade name of Wernw Pfleideren), TEM (trade name of Toshiba Machine Co., Ltd.), TEX (trade name of The Japan Steel Works, Ltd.), and KZW (trade name of Technovel Corporation); and a counter-rotating twin screw extruder such as CMP (trade name of The Japan Steel Works, Ltd.), FCM (trade name of Kobe Steel, Ltd.), NCM (trademark thereof), and LCM (trade name thereof).

Examples of a shape of the polypropylene resin composition of the present invention are a strand, a sheet, a flat plate, and a pellet obtained by cutting the strand into a suitable length. Among them, preferred is a 1 to 50 mm-long pellet, from a viewpoint of a stable production of a molded article from the polypropylene resin composition.

The polypropylene resin composition of the present invention has a haze value of preferably larger than 75%, measured using a 1 mm-thick sheet molded from the polypropylene resin composition, from a viewpoint of its balance between tensile strength and impact resistance at low temperature. The 1 mm-thick sheet can be made by a general method comprising molding the polypropylene resin composition at 180 to 270° C. (temperature for melting the polypropylene resin composition), at 3 to 130° C. (temperature for heating or cooling a mold; its cooling time being suitably-determined).

Examples of a molding method of the polypropylene resin composition of the present invention are an injection molding method, a press molding method, a vacuum molding method, an expansion molding method, and an extrusion molding method. Further examples thereof are a method of laminating the polypropylene resin composition with other resin, and a method of co-extruding the polypropylene resin composition with other resin. Among them, preferred is an injection molding method. Examples of the injection molding method are a conventional injection molding method, an injection foam molding method, a supercritical injection foam molding method, a ultrahigh speed injection molding method, an injection compression molding method, a gas-assist injection molding method, a sandwich molding method, a sandwich foam molding method, and an insert•outsert molding method.

Examples of a use of the polypropylene resin composition of the present invention are automotive components, home electrical components, monitoring components, OA equipment components, medical materials, drain pans, toiletry supplies, bottles, containers, sheets, films, and building materials. Examples of the automotive components are interior components such as door trims, pillars, instrument panels, consoles, locker panels, arm rests, door panels, and spare tire cover; exterior components such as bumpers, spoilers, fenders, and side steps; other components such as air-intake ducts, coolant reserve tanks, fender liners, fans, and underdeflectors; and integrated components such as front end panels. Examples of home electrical components are components of clothes washers such as an outer tank, an inner tank, a cover, a pulsator, and a balancer; drying machine components; vacuum cleaner components; rice cooker components; electric pot components; heat insulator components; dish washer components; and air cleaner components.

EXAMPLE

The present invention is explained in more detail with reference to the following Example, which does not limit the present invention.
1. Component (A): Propylene Polymer
Propylene Polymer A-1
A-1 was a mixture of polymer component (I) consisting of a propylene homopolymer with polymer component (II) consisting of a propylene-ethylene copolymer, which was produced by a liquid phase-gas phase polymerization method, using a polymerization catalyst obtained by a method disclosed in Example 1 of JP 2004-182981A, and which had the following properties:
  the mixture had a melt flow rate of 26 g/10 minutes, measured at 230° C. under a load of 2.16 kg;
  the mixture contained 7.4% by weight of an ethylene unit, the mixture being 100% by weight;
  the mixture had intrinsic viscosity ($[\eta]_{Total}$) of 1.4 dl/g;
  the mixture contained 80% by weight of polymer component (I), and 20% by weight of polymer component (II), the mixture being 100% by weight;
  polymer component (I) had an isotactic pentad fraction of 0.983;
  polymer component (I) had intrinsic viscosity ($[\eta]_I$) of 1.07 dl/g;
  polymer component (II) contained 37% by weight of an ethylene unit, polymer component (II) being 100% by weight;
  polymer component (II) had intrinsic viscosity ($[\eta]_{II}$) of 2.7 dl/g; and
  $[\eta]_{II}/[\eta]_I$ was 2.52.
Propylene Polymer A-2 (for Comparison)
A-2 was a mixture of polymer component (I) consisting of a propylene homopolymer with polymer component (II) consisting of a propylene-ethylene copolymer, produced similarly to the above, and having the following properties:
  the mixture had a melt flow rate of 9.4 g/10 minutes, measured at 230° C. under a load of 2.16 kg;
  the mixture contained 5.6% by weight of an ethylene unit, the mixture being 100% by weight;
  the mixture had intrinsic viscosity ($[\eta]_{Total}$) of 1.6 dl/g;
  the mixture contained 86% by weight of polymer component (I), and 14% by weight of polymer component (II), the mixture being 100% by weight;
  polymer component (I) had an isotactic pentad fraction of 0.983;
  polymer component (I) had intrinsic viscosity ($[\eta]_I$) of 1.4 dl/g;
  polymer component (II) contained 40% by weight of an ethylene unit, polymer component (II) being 100% by weight;
  polymer component (II) had intrinsic viscosity ($[\eta]_{II}$) of 2.9 dl/g; and
  $[\eta]_{II}/[\eta]_I$ was 2.07.
Propylene Polymer A-3 (for Comparison)
A-3 was a propylene homopolymer, having a melt flow rate of 17 g/10 minutes, measured at 230° C. under a load of 2.16 kg; intrinsic viscosity ($[\eta]$) of 1.34 dl/g; a melting temperature (Tm) of 162° C.; and an isotactic pentad fraction of 0.983.
2. Component (B): Ethylene Polymer
Ethylene Polymer B-1
B-1 was an ethylene-1-octene copolymer elastomer, ENGAGE EG8100 (trade name of Dow Chemical Japan Ltd.), having density of 0.87 g/cm$^3$; a melt flow rate of 1 g/10 minutes, measured at 190° C. under a load of 2.16 kg; 34.0% by weight a 1-octene unit, ethylene polymer B-1 being 100% by weight; and a melting temperature (Tm) of 50.5° C.
Ethylene Polymer B-2 (for Comparison)
B-2 was an ethylene homopolymer (high-density polyethylene: HDPE) produced by Keiyo Polyethylene Co., Ltd., having density of 0.960 g/cm$^3$; a melt flow rate of 16 g/10 minutes, measured at 190° C. under a load of 2.16 kg; intrinsic viscosity ($[\eta]$) of 1.04 dl/g; and a melting temperature (Tm) of 130.6° C.
3. Component (C): Amide Compound
Compound C-1
C-1 was N JESTER TF-1 (trade name of New Japan Chemical co., ltd.), having a chemical name of N,N',N''-tricyclohexyl-1,3,5-benzenetricarboxamide (general name: 1,3,5-benzenetricarboxylic acid tris(cyclohexylamide) represented by the following formula; CAS Reg. No. of 160535-

58-0; and a volume average particle diameter of 1.6 μm, measured with the above laser diffraction type-particle size distribution measurement apparatus.

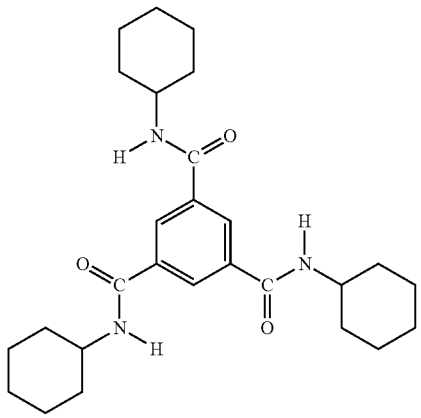 [SMILES: O=C(NC1CCCCC1)c1cc(C(=O)NC2CCCCC2)cc(C(=O)NC2CCCCC2)c1]

Compound C-2 (for Comparison)

C-2 was HYPERFORM HPN-68L (trade name of Milliken and Company), having a chemical name of disodium (1R,2R, 3S,4S)-bicyclo[2.2.1]heptane-2,3-dicarboxylate (purity: 80% by weight) represented by the following formula; and a volume average particle diameter of 2.0 μm, measured with the same apparatus as the above.

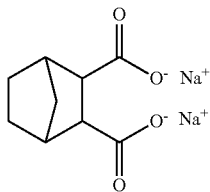

Compound C-3 (for Comparison)

C-3 was AL-PTBBA (trade name of Kyodo Chemical Co. Ltd.), having a chemical name of hydroxyl-di(p-tert-butyl benzoic acid) aluminum represented by the following formula; and a volume average particle diameter of 1.6 μm, measured with the same apparatus as the above.

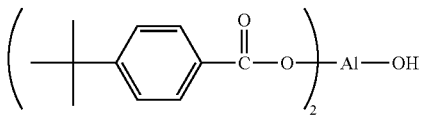

4. Component (D): Additive

Additive D-1

D-1 was a neutralizing agent manufactured by Kyodo Chemical Co. Ltd., having a chemical name of calcium stearate.

Additive D-2

D-2 was an antioxidant, SUMILIZER GA80 (trade name of Sumitomo Chemical Co., Ltd.), having a chemical name of 3,9-bis[2-(3-(3-tert-butyl-4-hydroxy-5-methylphenyl)propionyloxy)-1,1-dimethylethyl]-2,4,8,10-tetraoxaspiro[5•5]undecane.

Additive D-3

D-3 was an antioxidant, SONGNOX6260 (trade name of Matsubara sangyou, Ltd.), having a chemical name of bis(2, 4-di-tert-butylphenyl)pentaerythritoldiphosphite.

Example 1

1. Production of Propylene Polymer A-1

(1) Former Polymerization Step

To a stainless-steel liquid-phase loop polymerization reactor purged thoroughly with propylene, charged were triethylaluminum and cyclohexylethyldimethoxysilane. The loop reactor was regulated at 65 to 75° C. in its inner temperature, and at 4.5 MPa in its inner pressure (gauge pressure) with propylene and hydrogen. To the loop reactor, continuously supplied was a solid catalyst component prepared by a method disclosed in Example 1 of JP 2004-182981A, thereby homopolymerizing propylene in the liquid phase. The resultant propylene homopolymer was transferred continuously to the first vessel of a gas-phase polymerization rector composed of three vessels.

Propylene and hydrogen were supplied continuously to the first vessel while keeping polymerization temperature and pressure (gauge pressure) at 80° C. and 2.1 MPa, respectively, and keeping a hydrogen concentration constant in the gas phase, thereby homopolymerizing propylene in the gas phase in the presence of the propylene homopolymer transferred from the loop reactor. The propylene homopolymer in the first vessel was all transferred intermittently to the second vessel of the gas-phase polymerization rector.

Propylene and hydrogen were supplied continuously to the second vessel while keeping polymerization temperature and pressure (gauge pressure) at 80° C. and 1.7 MPa, respectively, and keeping a hydrogen concentration constant in the gas phase, thereby homopolymerizing propylene in the gas phase in the presence of the propylene homopolymer transferred intermittently from the first vessel. Accordingly, produced was polymer component (I), which was substantially a mixture of the propylene homopolymer transferred intermittently from the first vessel with the propylene homopolymer produced in the second vessel. A sample of polymer component (I) taken from the second vessel was found to have intrinsic viscosity ($[\eta_I]$) of 1.07 dl/g, and an isotactic pentad fraction of 0.983. Polymer component (I) was all transferred intermittently to the third vessel of the gas-phase polymerization rector.

(2) Latter Polymerization Step

Propylene, hydrogen and ethylene were supplied continuously to the third vessel while keeping polymerization temperature and pressure (gauge pressure) at 70° C. and 1.35 MPa, respectively, and keeping a hydrogen concentration and an ethylene concentration constant in the gas phase, thereby copolymerizing propylene and ethylene in the gas phase in the presence of polymer component (I) transferred intermittently from the second vessel. Accordingly, produced was polymer component (II) of a propylene-ethylene copolymer.

The resultant powdery polymer in the third vessel was transferred continuously to a deactivation vessel to deactivate the catalyst components contained in the polymer with water. The polymer was dried with hot nitrogen gas at 80° C., thereby obtaining a white powdery (propylene)-(propylene-ethylene)polymer (propylene polymer A-1), which was substantially a mixture of polymer components (I) and (II).

Propylene polymer A-1 was found to have (i) a melt flow rate of 26 g/10 minutes measured at 230° C. under a load of 2.16 kg, (ii) intrinsic viscosity ($[\eta_{Total}]$) of 1.4 dl/g, (iii) 7.4% by weight of an ethylene unit, propylene polymer A-1 being 100& by weight, and (iV) a ratio, $X_I/X_{II}$, of 80/20, $X_I$ and $X_{II}$ being a proportion by weight of polymer component (I) in propylene polymer A-1, and a proportion by weight of polymer component (II) therein, respectively, determined based on a material balance in the production of propylene polymer A-1.

Polymer component (II) was found to have (i) intrinsic viscosity ($[\eta]_{II}$) of 2.7 dl/g, calculated from the formula, $[\eta]_{II}=([\eta]_{Total}-[\eta]_I \times X_I)/X_{II}$, and (ii) 37% by weight of an ethylene unit, polymer component (II) being 100% by weight.

2. Production of Polypropylene Resin Composition

There were mixed 85% by weight of propylene polymer A-1, 15% by weight of ethylene polymer B-1, 0.05 part by weight compound C-1, and 0.05 part by weight of additive D-1 with one another in a tumble mixer for 5 minutes at room temperature, the total of propylene polymer A-1 and ethylene polymer B-1 being 100% by weight and 100 parts by weight.

The resultant mixture was melt kneaded with a co-rotating twin screw extruder, KZW (trade name of Technovel Corporation), having an inner diameter of 15 mm and a ratio, L/D, of 45, at cylinder temperature of 190° C. (cylinder zone C1), 200° C. (cylinder zone C2), and 220° C. (cylinder zone C3 to C6 and die), at a screw rotation speed of 300 rpm, and at an extrusion rate of about 6 kg/hour, wherein the melt kneaded mixture was found to have temperature of 220 to 230° C.

The melt kneaded mixture was filtered with a sintered metallic filter, FINEPORE NF15N (trade name of Nippon Seisen Co., Ltd.) having a filter precision of 100 μm, which was placed inside the above die attached to the downstream end of the cylinder, then was extruded through three outlets (diameter: 3 mm) of the die, then was cooled with cold water to form a solidified strand, and then was cut into pellets comprising a polypropylene resin composition.

The pellets were found to have a melt flow rate of 18 g/10 minutes; density of 0.895 g/cm$^3$; a haze value of 93% regarding its hot-press molding article and injection molding article; yield strength, rupture strength and elongation at rupture in its tensile test of 21 MPa, 20 MPa and 1,000% or more; and Izod impact strength of 8.5 kJ/m$^2$. Results are shown in Table 1.

The above properties of the pellets were measured using the following test piece:

(1) for the tensile test and Izod impact test, the test piece was prepared by molding the pellets with an injection molding machine, TOYO SI30III, manufactured by TOYO MACHINERY & METAL CO., LTD., at 230° C. (molding temperature) and 50° C. (mold temperature); and (2) for the haze test, the test piece was prepared by the following two molding methods (2-1) and (2-2):

(2-1) a press molding method, comprising steps of:
 (i) putting the pellets between two aluminum plates (each having 0.1 mm-thickness) placed on a stainless-steel square mold (150 mm×150 mm);
 (ii) heating the pellets at 230° C. for 5 minutes, thereby melting the pellets;
 (iii) hot-pressing the melted pellets at 230° C. under 5 MPa pressure;
 (iv) cold-pressing at 30° C. under 5 MPa pressure for 5 minutes, thereby obtaining a 1 mm-thick sheet;
 (v) setting the 1 mm-thick sheet for 48 hours or longer in an environment having temperature of 23±2° C., and relative humidity of 25±5%; and
 (vi) cutting out a rectangle-shaped test piece having a size of 35 mm×40 mm from the 1 mm-thick sheet; and (2-2) an injection molding method, comprising molding the pellets with an injection molding machine, TOYO SI30111, manufactured by TOYO MACHINERY & METAL CO., LTD., at 230° C. (molding temperature) and 50° C. (mold temperature), thereby obtaining a rectangle-shaped test piece having a size of 48 mm×48 mm×1 mm (thickness).

The above properties were measured by the following methods:

1. Melt Flow Rate (MFR: g/10 Minutes)

It was measured by a method prescribed in JIS-K-7210-1999, at 230° C. under a load of 2.16 kg in case of the propylene polymer or the polypropylene resin composition, and at 190° C. under a load of 2.16 kg in case of the ethylene polymer, JIS being Japan Industrial Standard.

2. Density (g/cm$^3$)

It was measured by a method prescribed in JIS-K7112-1999.

3. Melting Temperature (° C.)

It was measured according to a method prescribed in JIS-K-7121-1987, using differential scanning calorimetry (DSC), by the following method comprising steps of:

(1) melting a sample completely at higher temperature by 50° C. or more than its melting temperature;

(2) cooling the sample down to lower temperature than its crystallization temperature (to 23° C. in case of the propylene polymer, and to −20° C. in case of the ethylene polymer), at a cooling rate of 5° C./minute;

(3) heating the sample at a heating rate of 5° C./minute, thereby obtaining an endothermic curve; and (4) considering a peak temperature in the endothermic curve as a melting temperature of the sample.

4. Intrinsic Viscosity (dl/g)

It was measured by a method (extrapolation method), comprising steps of:

(1) measuring reduced viscosities of three tetralin solutions having concentrations of 0.1 g/dl, 0.2 g/dl and 0.5 g/dl, respectively, at 135° C. with an Ubbellohde viscometer;

(2) plotting those reduced viscosities for those concentrations, respectively; and (3) extrapolating the concentration to zero, thereby obtaining intrinsic viscosity.

The extrapolation method is disclosed in "Kobunshi Yoeki, Kobunshi Jikkengaku 11" (published by Kyoritsu Shuppan Co. Ltd. in 1982), page 491.

Intrinsic viscosity of polymer component (II), $[\eta]_{II}$, is calculated from the formula, $[\eta]_{II}=([\eta]_{Total}-[\eta]_I \times X_I)/X_{II}$, wherein $[\eta]_{Total}$, $[\eta]_I$, $X_I$ and $X_{II}$ are defined above.

5. Ethylene Unit Content and α-Olefin Unit Content (% by Weight)

A content of an ethylene unit or α-olefin unit (1-octene unit) contained in the propylene polymer or ethylene polymer was measured by a $^{13}$C-nuclear magnetic resonance method ($^{13}$C-NMR method) disclosed in "Kobunshi Bunseki Handbook (New Edition)" edited by Chemical Society of Japan and Polymer Analysis Research Society, published by Kinokuniya Co., Ltd. (1995). In order to determine an α-olefin unit content in the ethylene polymer, peaks in $^{13}$C-NMR spectrum of the ethylene polymer were assigned with reference to James C. Randall, J. Macromol. Sci., Rev. Macromol. Chem. Phs., C29 (2 & 3), 29, 201-317 (1989).

6. Ethylene Unit Content in Polymer Component (II) (% by Weight)

An ethylene unit content in polymer component (II) was determined based on:
 the proportion by weight of polymer components (I) and (II) (namely, $X_I$ and $X_{II}$); and
 a content of an ethylene unit in propylene polymer obtained by the following method comprising steps of:

(1) dissolving homogeneously about 200 mg of the propylene polymer in 3 mL of an o-dichlorobenzene (4 parts by volume)/o-dichlorobenzene-$d_1$ (1 part by volume) mixed solvent, in a 10 mm-$\phi$ test tube;

(2) measuring a $^{13}$C-NMR spectrum of the resultant solution under the following conditions; and NMR apparatus: JNM-EX270 (trade name of JEOL LTD),
measurement temperature: 135° C.,
pulse repetition time: 10 seconds,
pulse width: 45°, and
cumulated number: 2,500 times, (3) determining a content of an ethylene unit content from the $^{13}$C-NMR spectrum, based on the report disclosed in Kakugo, et al. Macromolecules, volume 15, pages 1150-1152 (1982).

7. Isotactic Pentad Fraction (mmmm Fraction)

It was determined by calculating a ratio of an mmmm peak area to an all peak area of carbon atoms of methyl groups in a $^{13}$C-NMR spectrum measured with an NMR apparatus, AM400 (trade name of Bruker Corporation), wherein those peaks were assigned based on Macromolecules, volume 8, page 687 (1975).

8. Tensile Test

It was carried out by subjecting an injection-molded 2 mm-thick test piece to a tensile test at a tensile rate of 50 mm/minute, at 23° C., according to a method prescribed in ASTM D638.

9. Izod Impact Strength (kJ/m$^2$)

It was measured by subjecting an injection-molded 4 mm-thick test piece (notched) to an impact test at −20° C., according to a method prescribed in JIS-K-7110.

10. Haze (%)

It was measured by a method prescribed in JIS-K-7105-1981 using the above test piece, at 23° C., with an apparatus, DIRECT READING HAZE METER (trade name of Toyo Seiki Seisaku-sho, LTD.).

Example 2

Example 1 was repeated except that 0.05 part by weight of compound C-1 was changed to 0.1 part by weight thereof. Results are shown in Table 1.

Example 3

Example 1 was repeated except that 0.05 part by weight of compound C-1 was changed to 0.2 part by weight thereof. Results are shown in Table 1.

Comparative Example 1

Example 1 was repeated except that 0.05 part by weight of compound C-1 was changed to 0.2 part by weight of compound C-2. Results are shown in Table 1.

Comparative Example 2

Example 1 was repeated except that 0.05 part by weight of compound C-1 was changed to 0.2 part by weight of compound C-3. Results are shown in Table 1.

Comparative Example 3

Example 1 was repeated except that compound C-1 was not used. Results are shown in Table 1.

Comparative Example 4

Example 1 was repeated except that (i) ethylene polymer B-1 was changed to ethylene polymer B-2, and (ii) 0.05 part by weight of compound C-1 was changed to 0.2 part by weight thereof. Results are shown in Table 1.

Comparative Example 5

Example 1 was repeated except that (i) ethylene polymer B-1 was not used, and (ii) 0.05 part by weight of compound C-1 was changed to 0.2 part by weight thereof. Results are shown in Table 1.

Comparative Example 6

Example 1 was repeated except that (i) ethylene polymer B-1 was not used, and (ii) 0.05 part by weight of compound C-1 was changed to 0.2 part by weight of compound C-3. Results are shown in Table 1.

Comparative Example 7

Example 1 was repeated except that (i) ethylene polymer B-1 and compound C-1 were not used. Results are shown in Table 1.

Comparative Example 8

Example 1 was repeated except that (i) propylene polymer A-1 was changed to propylene polymer A-2, and (ii) 0.05 part by weight of compound C-1 was changed to 0.2 part by weight thereof. Results are shown in Table 1.

Comparative Example 9

Example 1 was repeated except that (i) propylene polymer A-1 was changed to propylene polymer A-2, and (ii) 0.05 part by weight of compound C-1 was changed to 0.2 part by weight of compound C-3. Results are shown in Table 1.

Comparative Example 10

Example 1 was repeated except that (i) propylene polymer A-1 was changed to propylene polymer A-2, and (ii) compound C-1 was not used. Results are shown in Table 1.

TABLE 1

| | Example | | |
|---|---|---|---|
| | 1 | 2 | 3 |
| Component (A) (% by weight) | | | |
| A-1 | 85 | 85 | 85 |
| A-2 | | | |

TABLE 1-continued

| Component (B) (% by weight) | | | |
|---|---|---|---|
| B-1 | 15 | 15 | 15 |
| B-2 | | | |
| Component (C) (part by weight) | | | |
| C-1 | 0.05 | 0.1 | 0.2 |
| C-2 | | | |
| C-3 | | | |
| Component (D) (part by weight) | | | |
| D-1 | | 0.05 | |
| D-2 | | 0.05 | |
| D-3 | | 0.1 | |
| MFR (g/10 minutes) | 18 | 18 | 18 |
| Density (g/cm³) | 0.895 | 0.895 | 0.896 |
| Haze (%) (Note 1) | 93/93 | 93/93 | 93/92 |
| Tensile property | | | |
| Yield strength (MPa) | 21 | 21 | 21 |
| Rupture strength (MPa) | 20 | 20 | 30 |
| Elongation at rupture (%) | >1000 | >1000 | >1000 |
| Izod impact strength at −20° C.(kj/m2) | 8.5 | 9.9 | 9.9 |

The total of components (A) and (B) is 100% by weight, and is also 100 Parts by weight.
(Note 1): Press-molded test piece/Injection-molded test piece

| | Comparative Example | | | | | | | | | |
|---|---|---|---|---|---|---|---|---|---|---|
| | 1 | 2 | 3 | 4 | 5 | 6 | 7 | 8 | 9 | 10 |
| Component (A) (% by wt.) | | | | | | | | | | |
| A-1 | 85 | 85 | 85 | 85 | 100 | 100 | 100 | | | |
| A-2 | | | | | | | | 85 | 85 | 85 |
| Component (B) (% by wt.) | | | | | | | | | | |
| B-1 | 15 | 15 | 15 | | — | — | — | 15 | 15 | 15 |
| B-2 | | | | 15 | — | — | — | | | |
| Component (C) (part by wt.) | | | | | | | | | | |
| C-1 | | | — | 0.2 | 0.2 | | — | 0.2 | | — |
| C-2 | 0.2 | | | | | | | | | |
| C-3 | | 0.2 | — | | | 0.2 | | | 0.2 | — |
| Component (D) (part by wt.) | | | | | | | | | | |
| D-1 | | | | | 0.05 | | | | | |
| D-2 | | | | | 0.05 | | | | | |
| D-3 | | | | | 0.1 | | | | | |
| MFR (g/10 minutes) | 18 | 19 | 19 | 22 | 26 | 28 | 26 | 7.2 | 7.1 | 7.4 |
| Density (g/cm³) | 0.897 | 0.896 | 0.894 | 0.908 | 0.900 | 0.901 | 0.898 | 0.898 | 0.898 | 0.896 |
| Haze (%) (Note 1) | 93/92 | 93/92 | 93/92 | 93/90 | 93/93 | 93/93 | 93/93 | 93/87 | 93/87 | 93/86 |
| Tensile property | | | | | | | | | | |
| Yield strength (MPa) | 21 | 21 | 20 | 26 | 26 | 26 | 25 | 26 | 26 | 25 |
| Rupture strength (MPa) | 28 | 29 | 28 | 19 | 18 | 18 | 20 | 26 | 26 | 33 |
| Elongation at rupture (%) | >1000 | >1000 | >1000 | 487 | 466 | 261 | >1000 | 983 | 980 | >1000 |
| Izod impact strength at −20° C. (kj/m2) | 7.3 | 8.0 | 7.0 | 6.0 | 4.1 | 3.8 | 3.5 | 7.7 | 6.3 | 5.1 |

Comparative Example 11

1. Production of Propylene Polymer A-3

To a stainless-steel liquid-phase loop polymerization reactor purged thoroughly with propylene, charged were triethylaluminum and cyclohexylethyldimethoxysilane. The loop reactor was regulated at 60° C. in its inner temperature, and at 3.5 MPa in its inner pressure (gauge pressure) with propylene and hydrogen. To the loop reactor, continuously supplied was a solid catalyst component prepared by a method disclosed in Example 1 of JP 2004-182981A, thereby homopolymerizing propylene in the liquid phase. The resultant propylene homopolymer was transferred continuously to the first vessel of a gas-phase polymerization rector composed of three vessels.

Propylene and hydrogen were supplied continuously to the first vessel while keeping polymerization temperature and pressure (gauge pressure) at 83° C. and 2.1 MPa, respectively, and keeping a hydrogen concentration constant in the gas phase, thereby homopolymerizing propylene in the gas phase in the presence of the propylene homopolymer transferred from the loop reactor. The propylene homopolymer in the first vessel was all transferred intermittently to the second vessel of the gas-phase polymerization rector.

Propylene and hydrogen were supplied continuously to the second vessel while keeping polymerization temperature and pressure (gauge pressure) at 83° C. and 1.7 MPa, respectively, and keeping a hydrogen concentration constant in the gas phase, thereby homopolymerizing propylene in the gas phase in the presence of the propylene homopolymer transferred intermittently from the first vessel. The propylene homopolymer was all transferred intermittently to the third vessel of the gas-phase polymerization rector.

Propylene and hydrogen were supplied continuously to the third vessel while keeping polymerization temperature and pressure (gauge pressure) at 83° C. and 1.35 MPa, respectively, and keeping a hydrogen concentration constant in the gas phase, thereby homopolymerizing propylene in the gas phase in the presence of the propylene homopolymer transferred intermittently from the second vessel.

The resultant powdery polymer in the third vessel was transferred continuously to a deactivation vessel to deactivate the catalyst components contained in the polymer with water. The polymer was dried with hot nitrogen gas at 110° C., thereby obtaining white powdery propylene polymer A-3. A ratio by weight of an amount of propylene polymerized in the loop polymerization reactor, in the first vessel of the gas-phase polymerization rector, in the second vessel thereof, and in the third vessel thereof was found to be 10/54/21/15.

Propylene polymer A-3 was found to have a melt flow rate of 17 g/10 minutes measured at 230° C. under a load of 2.16 kg, intrinsic viscosity of 1.34 dl/g, a melting temperature of 162° C., and an isotactic pentad fraction of 0.983.

2. Production of Polypropylene Resin Composition

There were mixed 100 parts by weight of propylene polymer A-3, 0.05 part by weight additive D-1, 0.05 part by weight additive D-2, and 0.1 part by weight of additive D-3 with one another in a tumble mixer for 5 minutes at room temperature. The resultant mixture was melt kneaded similarly to Example 1, thereby obtaining pellets. Results are shown in Table 2.

Comparative Example 12

Comparative Example 11 was repeated except that 0.2 part by weight of compound C-1 was further used. Results are shown in Table 2.

Comparative Example 13

Comparative Example 11 was repeated except that (i) 100 parts by weight of propylene polymer A-3 was changed to 85 parts by weight thereof, (ii) 15 parts by weight of ethylene polymer B-1 was further used, and (iii) 0.2 part by weight of compound C-1 was further used. Results are shown in Table 2.

Comparative Example 14

Comparative Example 11 was repeated except that (i) 100 parts by weight of propylene polymer A-3 was changed to 80 parts by weight thereof, (ii) 20 parts by weight of ethylene polymer B-1 was further used, and (iii) 0.2 part by weight of compound C-1 was further used. Results are shown in Table 2.

Comparative Example 15

Comparative Example 11 was repeated except that (i) 100 parts by weight of propylene polymer A-3 was changed to 70 parts by weight thereof, (ii) 30 parts by weight of ethylene polymer B-1 was further used, and (iii) 0.2 part by weight of compound C-1 was further used. Results are shown in Table 2.

TABLE 2

| | Comparative Example | | | | |
|---|---|---|---|---|---|
| | 11 | 12 | 13 | 14 | 15 |
| Component (A) (part by weight) | | | | | |
| A-3 | 100 | 100 | 85 | 80 | 70 |
| Component (B) (part by weight) | | | | | |
| B-1 | | | 15 | 20 | 30 |
| Component (C) (part by weight) | | | | | |
| C-1 | | 0.2 | 0.2 | 0.2 | 0.2 |
| Component (D) (part by weight) | | | | | |
| D-1 | | | 0.05 | | |
| D-2 | | | 0.05 | | |
| D-3 | | | 0.1 | | |
| MFR (g/10 minutes) | 18 | 18 | 14 | 13 | 11 |
| Density (g/cm³) | 0.907 | 0.910 | 0.904 | 0.901 | 0.898 |
| Haze(%)(Note 1) | 70/71 | 66/37 | 93/77 | 93/77 | 93/76 |
| Tensile property | | | | | |
| Yield strength(MPa) | 37 | 41 | 33 | 30 | 26 |
| Rupture strength(MPa) | 35 | 26 | 23 | 24 | 24 |
| Elongation at rupture(%) | >1000 | 227 | 990 | 980 | 991 |
| Izod impact strength at −20° C. (kj/m2) | 1.6 | 1.5 | 2.4 | 3.2 | 6.0 |

The invention claimed is:

1. A polypropylene resin composition, comprising following components (A), (B) and (C):
   (A) 51 to 99% by weight of a propylene polymer having a melt flow rate of 10 to 200 g/10 minutes measured at 230° C. under a load of 2.16 kg, and containing 0.1 to 40% by weight of an ethylene unit and/or α-olefin unit having 4 to 10 carbon atoms and 60 to 99.9% by weight of a propylene unit;
   (B) 1 to 49% by weight of an ethylene polymer having density of 0.85 to 0.93 g/cm³; and
   (C) 0.001 to 5 parts by weight of an amide compound as a nucleating agent;
   wherein the percentage by weight amounts of components (A) and (B) are based on the combined amount of components (A) and (B), the amount of component (C) expressed in parts by weight is based on 100 parts by weight of the combined amount of components (A) and (B), and the total of the ethylene unit, α-olefin unit and propylene unit is 100% by weight, wherein component (A) has an isotactic pentad fraction as measured by $^{13}$C-NMR analysis of 0.97 or more;
   wherein the propylene polymer is a mixture containing 1 to 50% by weight of following polymer component (I) and 50 to 99% by weight of following polymer component (II):
   (I) a propylene polymer component having intrinsic viscosity, $[\eta]_I$ of 0.1 to 5 dl/g measured at 135° C. in tetralin; and
   (II) a polymer component having intrinsic viscosity, $[\eta]_{II}$ of 1 to 20 dl/g measured at 135° C. in tetralin, and containing 1 to 80% by weight of an ethylene unit and/or α-olefin unit having 4 to 10 carbon atoms, and 20% to 99% by weight of a propylene unit;

wherein the percentage by weight amounts of polymer components (I) and (II) are based on the combined amount of polymer components (I) and (II), and the total percentage by weight amount of ethylene unit and/or α-olefin unit and the percentage by weight amount of propylene unit are based on the combined amount of the ethylene unit, the α-olefin unit and the propylene unit, and wherein the amide compound is a compound represented by the following formula (I):

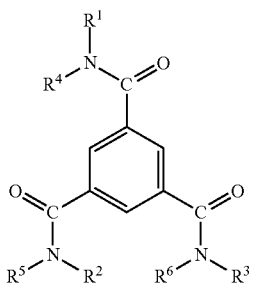

wherein $R^1$, $R^2$ and $R^3$ are the same as, or different from one another, and are a hydrogen atom or a hydrocarbyl group having 1 to 20 carbon atoms; and $R^4$, $R^5$ and $R^6$ are the same as or different from one another and are a hydrogen atom, a hydrocarbyl group having 1 to 20 carbon atoms, or a group represented by the following formula (1)

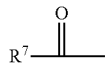

wherein $R^7$ is a hydrogen atom, a hydroxyl group, a hydrocarbyl group having 1 to 20 carbon atoms, a hydrocarbyloxy group having 1 to 20 carbon atoms, a mono(1 to 20 carbon atom containing hydrocarbyl)amino group, a di(1 to 20 carbon atom-containing hydrocarbyl)amino group, or a hydrocarbyl group having 1 to 20 carbon atoms.

2. The polypropylene resin composition according to claim 1, wherein the mixture containing polymer components (I) and (II) is produced in a multistage manner with two or more polymerization reactors.

3. The polypropylene resin composition according to claim 1, wherein the ethylene polymer contains 51 to 99% by weight of an ethylene unit and 1 to 49% by weight of an α-olefin unit having 4 to 10 carbon atoms, and has a melt flow rate of 0.5 to 50 g/10 minutes measured at 190° C. under a load of 2.16 kg, provided that the total of the ethylene unit and the α-olefin unit is 100% by weight.

4. The polypropylene resin composition according to claim 1, wherein the polypropylene resin composition has a haze value of larger than 75%, measured with a 1 mm-thick sheet molded from the polypropylene resin composition.

* * * * *